US009477601B2

(12) United States Patent
Zhang et al.

(10) Patent No.: US 9,477,601 B2
(45) Date of Patent: Oct. 25, 2016

(54) APPARATUS AND METHOD FOR DETERMINING A SECTOR DIVISION RATIO OF A SHARED CACHE MEMORY

(71) Applicant: FUJITSU LIMITED, Kawasaki-shi, Kanagawa (JP)

(72) Inventors: Lei Zhang, Yokohama (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 7 days.

(21) Appl. No.: 14/694,186

(22) Filed: Apr. 23, 2015

(65) Prior Publication Data

US 2015/0339229 A1 Nov. 26, 2015

(30) Foreign Application Priority Data

May 22, 2014 (JP) ................................ 2014-106155

(51) Int. Cl.

| | |
|---|---|
| ***G06F 12/00*** | (2006.01) |
| ***G06F 12/08*** | (2016.01) |
| ***G06F 3/06*** | (2006.01) |
| ***G06F 9/50*** | (2006.01) |

(52) U.S. Cl.

CPC ........... *G06F 12/084* (2013.01); *G06F 3/0613* (2013.01); *G06F 3/0631* (2013.01); *G06F 3/0635* (2013.01); *G06F 3/0658* (2013.01); *G06F 3/0683* (2013.01); *G06F 9/50* (2013.01); *G06F 12/0842* (2013.01); *G06F 12/0893* (2013.01); *G06F 2212/1021* (2013.01); *G06F 2212/152* (2013.01); *G06F 2212/251* (2013.01); *G06F 2212/6046* (2013.01)

(58) Field of Classification Search

CPC ...... G06F 12/084; G06F 9/50; G06F 3/0613; G06F 3/0683; G06F 3/0631; G06F 12/0893; G06F 3/0658; G06F 12/0842; G06F 3/0635; G06F 2212/152; G06F 2212/251; G06F 2212/6046; G06F 2212/1021

See application file for complete search history.

(56) References Cited

U.S. PATENT DOCUMENTS 5,787,490 A * 7/1998 Ozawa ................ G06F 12/0842 711/158
2003/0172234 A1 9/2003 Soltis, Jr.

(Continued)

FOREIGN PATENT DOCUMENTS

JP 11-509356 8/1999
JP 2004-30574 1/2004

(Continued)

OTHER PUBLICATIONS

Fujitsu Limited, "SPARC64™ VIIIfx Extensions", Version 15, Apr. 26, 2010, 358 pp., <http://img.jp.fujitsu.com/downloads/jp/jhpc/sparc64viiifx-extensions.pdf, http://img.jp.fujitsu.com/downloads/jp/jhpc/sparc64viiifx-extensionsj.pdf>.

*Primary Examiner* — John A Lane
(74) *Attorney, Agent, or Firm* — Staas & Halsey LLP

(57) ABSTRACT

An apparatus includes a shared cache memory and a controller. The shared cache memory is configured to be divided into sectors by assigning one or more ways to each sector in accordance with a reusability level of data. The controller changes a sector division ratio indicating a ratio between way counts of the divided sectors of the shared cache memory, where the way count is a number of ways assigned to each sector. When first and second jobs are being executed in parallel, in response to a designation of a program of the second job, the controller calculates the sector division ratio, based on data access amount including a size and an access count of data accessed by the first and second jobs and a volume of the shared cache memory, and changes the sector division ratio of the shared cache memory to the calculated sector division ratio.

20 Claims, 24 Drawing Sheets

(56) References Cited

U.S. PATENT DOCUMENTS

| | | | |
|---|---|---|---|
| 2008/0034162 A1 | 2/2008 | Sturges et al. | |
| 2009/0172289 A1 | 7/2009 | Yamamura et al. | |
| 2011/0238899 A1* | 9/2011 | Yano | G06F 12/0246 711/103 |

FOREIGN PATENT DOCUMENTS

| | | |
|---|---|---|
| JP | 2009-163450 | 7/2009 |
| JP | 2010-244205 | 10/2010 |
| JP | 2011-203995 | 10/2011 |

* cited by examiner

| OPTIMIZATION SECTION ID | ADDRESS | ACCESS COUNT | SIZE (BYTE) |
|---|---|---|---|
| 123 | 0x00000811e7c53430 | 1024 | 2048 |
| 123 | 0x00001611e7c53000 | 256 | 2048 |
| 123 | 0xfffffa1143c10400 | 1 | 100 |
| 123 | 0xfffffb611e7c5000 | 64 | 2048 |
| 123 | 0xffff000143c10400 | 2048 | 8 |
| ... | ... | ... | ... |
| | | | |
| | | | |

| | OPTIMIZATION SECTION ID | ADDRESS | ACCESS COUNT | SIZE (BYTE) |
|---|---|---|---|---|
| d1 | 212 | 0x00002131edf32100 | 1024 | 1024 |
| | 212 | 0xfffffc114229012 | 256 | 2048 |
| | ... | ... | ... | ... |
| d2 | 123 | 0x00000811e7c53430 | 1024 | 2048 |
| | 123 | 0x00001611e7c53000 | 256 | 2048 |
| | 123 | 0xfffffa1143c10400 | 1 | 100 |
| | 123 | 0xfffffb611e7c5000 | 64 | 2048 |
| | 123 | 0xffff000143c10400 | 2048 | 8 |
| | ... | ... | ... | ... |

H2

| OPTIMIZATION SECTION ID | ADDRESS | ACCESS COUNT | SIZE (BYTE) |
|---|---|---|---|
| 212 | 0x00002131edf32100 | 1024 | 1024 |
| 212 | 0xfffffc114229012 | 256 | 2048 |
| ... | ... | ... | ... |
| 123 | 0x00000811e7c53430 | 1024 | 2048 |
| 123 | 0x00001611e7c53000 | 256 | 2048 |
| 123 | 0xfffffa1143c10400 | 1 | 100 |
| 123 | 0xfffffb611e7c5000 | 64 | 2048 |
| 123 | 0xffff000143c10400 | 2048 | 8 |
| ... | ... | ... | ... |

APPARATUS AND METHOD FOR DETERMINING A SECTOR DIVISION RATIO OF A SHARED CACHE MEMORY

CROSS-REFERENCE TO RELATED APPLICATIONS

This application is based upon and claims the benefit of priority of the prior Japanese Patent Application No. 2014-106155 filed on May 22, 2014, the entire contents of which are incorporated herein by reference.

FIELD

The embodiments discussed herein are related to apparatus and method for determining a sector division ratio of a shared cache memory.

BACKGROUND

A cache memory has been used in order to improve performance of a program executing process. The cache memory is a high-speed memory which is installed in a central processing unit (CPU), or in a core of the CPU. The performance of the program executing process is improved by holding data having high reusability in the cache memory. Volume of the cache memory is smaller than that of a main memory. Accordingly, it is effective to hold the data having high reusability in the cache memory in order to increase a cache hit rate of the cache memory.

As a method of holding the data having high reusability in the cache memory, there is a cache memory having a sector function. In the cache memory having the sector function, a program indicates a sector storing data in accordance with the reusability of data. With this, there is a high possibility to hold the data having high reusability in the cache memory, thereby increasing the cache hit rate. The sector division ratio is set to be optimal.

A division control of the cache memory is disclosed in, for example, Japanese Laid-open Patent Publication No. 2009-163450, Japanese Laid-open Patent Publication No. 2010-244205, Japanese Laid-open Patent Publication No. 2011-203995, Japanese Laid-open Patent Publication No. 2004-030574, Japanese National Publication of International Patent Application No. 11-509356, and "SPARC64VIIIfx Extensions" (http: //img.jp.fujitsu.com/downloads/jp/jhpc/sparc64viiifx-extensions. pdf, http: //img.jp.fujitsu.com/downloads/jp/jhpc/sparc64viiifx-extensionsj.pdf).

SUMMARY

According to an aspect of the invention, an apparatus includes a shared cache memory and a controller. The shared cache memory is configured to be divided into sectors by assigning one or more ways to each sector in accordance with a reusability level of data. The controller changes a sector division ratio indicating a ratio between way counts of the divided sectors of the shared cache memory, where the way count is a number of ways assigned to each sector. When first and second jobs are being executed in parallel, in response to a designation of a program of the second job, the controller calculates the sector division ratio, based on data access amount including a size and an access count of data accessed by the first and second jobs and a volume of the shared cache memory, and changes the sector division ratio of the shared cache memory to the calculated sector division ratio.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of cache use state information for each variable, according to an embodiment;

FIG. 14 is a diagram illustrating an example of a total data access amount of running jobs using a shared cache memory, according to an embodiment;

DESCRIPTION OF EMBODIMENTS

In recent years, an information processing apparatus has been configured to include a plurality of cores. In addition, the information processing apparatus includes a shared cache memory using the plurality of cores. Each of the plurality of cores may execute different programs. In a case where a shared cache memory has a sector function, it is desirable that a sector division ratio of the shared cache memory is set with respect to execution of a plurality of programs.

Hereinafter, embodiments of the present disclosure will be described with reference to the accompanying drawings. However, the technical scope of the present disclosure is not limited to these embodiments, and thus includes matters as described in the claims and their equivalents.

Information Processing System

Figure 1:
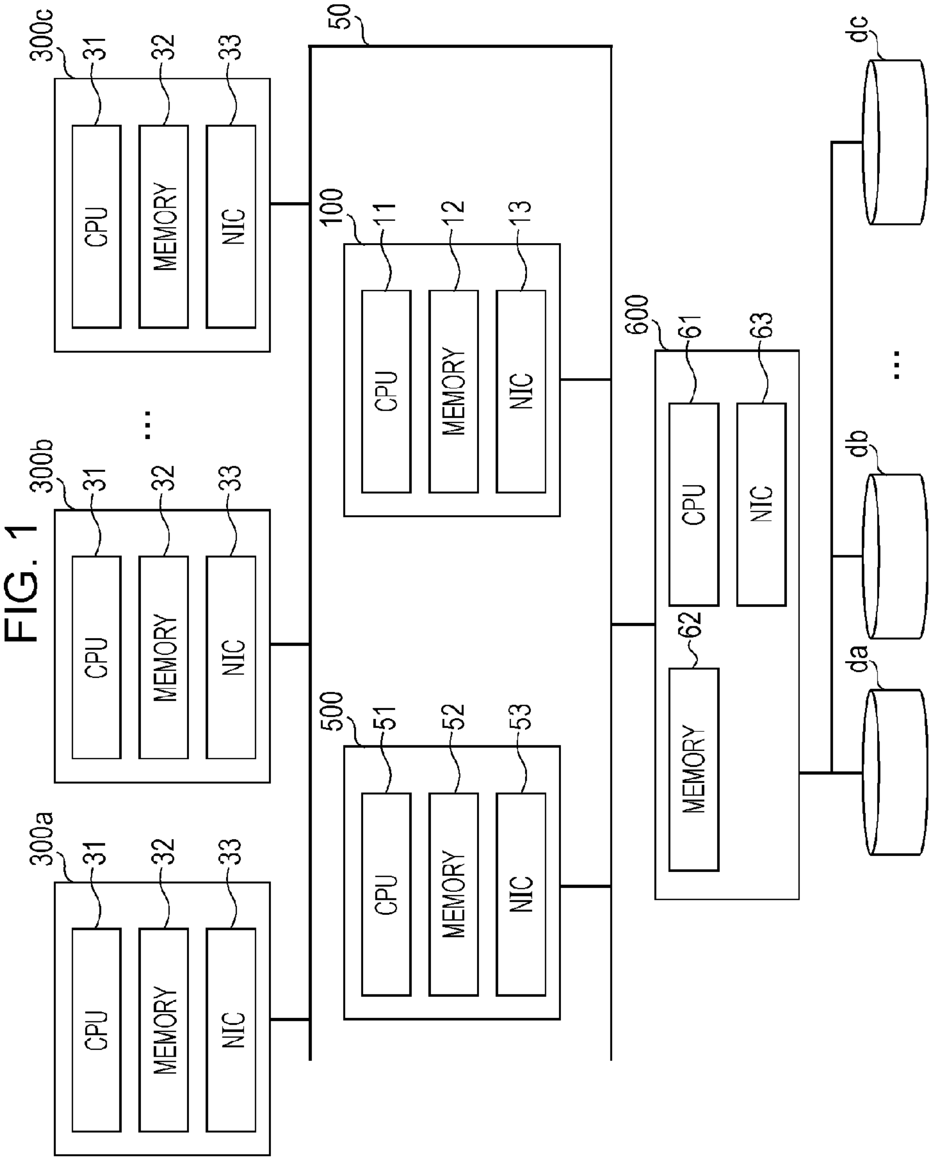
FIG. 1 is a diagram illustrating an example of a hardware configuration of an information processing system, according to an embodiment.

FIG. 1 is a diagram illustrating an example of a hardware configuration of an information processing system, according to an embodiment. The information processing system as illustrated in FIG. 1 is, for example, a high-performance computing (HPC) system. In the HPC system, a plurality of job schedules are generated and information processing apparatuses 300_a_ to 300_c_ are operated based on the plurality of job schedules.

The information processing system as illustrated in FIG. 1 includes a plurality of information processing apparatuses 100, 300_a_ to 300_c_, 500, and 600. Among the plurality of information processing apparatuses, the information processing apparatuses 300_a_ to 300_c_ are apparatuses only for a computing process, and nodes for job execution environment (hereinafter, referred to as a computation node). The information processing apparatus 100 is an apparatus for controlling the job execution, and is a node for job control environment (hereinafter, referred to as a control node). The information processing apparatus 500 is a node for compiling environment which compiles a source program to generate an executable program (hereinafter, referred to as a compile node). The information processing apparatus 600 is a file server connecting to disk drives da to dc.

The control node 100 is connected to the plurality of computation nodes 300_a_ to 300_c_, the compile node 500, and the file server 600 via a network 50. The control node 100, the computation nodes 300_a_ to 300_c_, the compile node 500, and the file server 600 respectively have central process units (CPU) 11, 31, 51, and 61, memories 12, 32, 52, and 62 such as a random access memory (RAM), and network interface cards (NIC) 13, 33, 53, and 63. A configuration of the CPU 31 will be described with reference to FIG. 2.

The compile node 500 reads out the source program from the disk drives da to dc, compiles the read out source program, and then generates an executable program (hereinafter, referred to as an execution program). The execution program is a job. In addition, the compile node 500 stores the generated execution program in the disk drives da to dc.

The control node 100 generates the job schedules and manages a progress status of an execution state or a schedule of job. The control node 100 allocates, depending on a time, one or more of computation nodes 300_a_ to 300_c_ which execute jobs so as to generate schedules. At this time, the control node 100 allocates the computation nodes 300_a_ to 300_c_ to the jobs based on information on the number of the computation nodes 300_a_ to 300_c_ used for the jobs, job execution conditions, and performance of the computation nodes 300_a_ to 300_c_. The job execution conditions means conditions related to the parallel degree and communication of the job.

In addition, the control node 100 outputs an instruction of the job execution based on the schedule to the computation nodes 300_a_ to 300_c_. The computation nodes 300_a_ to 300_c_ which receive an execution instruction execute jobs according to input information and an execution program which are read out from the disk drives da to dc in response to the instruction from the control node 100. In addition, the computation nodes 300_a_ to 300_c_, when finishing the job execution, notifies the control node 100 of the job execution result and causes a job execution log to be stored in the disk drives da to dc. The control node 100 manages the progress state of the jobs based on the execution result of the jobs which are received from the computation nodes 300_a_ to 300_c_.

Computation Node

Figure 2:
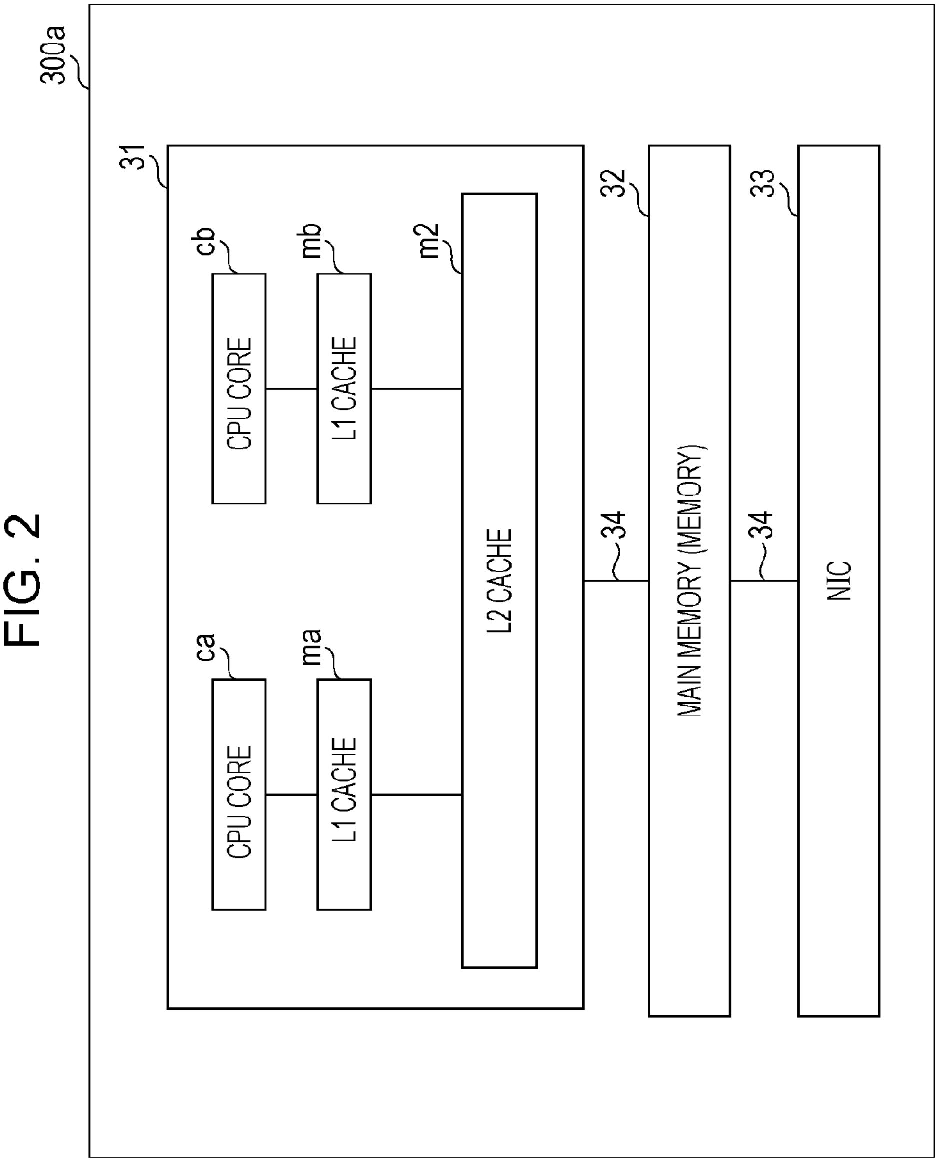
FIG. 2 is a diagram illustrating an example of a hardware configuration of a CPU of a computation node, according to an embodiment.

FIG. 2 is a diagram illustrating an example of a hardware configuration of a CPU of a computation node, according to an embodiment. In this example, while the hardware configuration of the computation node 300_a_ of the CPU 31 as illustrated in FIG. 1 is only described, the same is also true for hardware configurations of other computation nodes 300_b_ and 300_c_ of the CPU 31. Hereinafter, the computation nodes 300_b_ and 300_c_ are referred to as a computation node 300.

In this embodiment, the computation node 300_a_ as illustrated in FIG. 2 includes the CPU 31, a memory (a main memory) 32, and the NIC 33 as illustrated in FIG. 1. In addition, the CPU 31 includes two CPU cores ca and cb, cache memories at Level 1 (hereinafter, referred to as an L1 cache) ma and mb, and a cache memory (hereinafter, referred to as the L2 cache) m2 at Level 2 of the embodiment. The L1 cache ma and the L1 cache mb are cache memories dedicated for CPU core ca and CPU core cb, respectively. In the embodiment, an L2 cache m2 is a shared cache memory which a plurality of (two in example of FIG. 2) CPU cores ca and cb share.

Meanwhile, in the example of FIG. 2, the CPU 31 includes the two CPU cores ca and cb, but the number of CPU cores is not limited thereto. The CPU 31 may include three or more of CPU cores, for example, sixteen CPU cores. In addition, only the L2 cache m2 is described in the example of FIG. 2, but the CPU 31 may be further equipped with the shared cache memory such as a L3 cache and a L4 cache.

The CPU 31 causes some items of data stored in the main memory 32 to be stored in the L1 caches ma and mb, and the L2 cache m2. The L1 caches ma and mb, and the L2 cache m2 include a cache controller (not illustrated). The cache controller determines whether or not, when performing data access, access target data is stored in the L1 cache ma or mb. When the access target data is stored in the L1 cache ma or mb, the cache controller reads out the data from the L1 cache ma or mb.

When the access target data is not stored in the L1 cache ma or mb, the cache controller determines whether or not the access target data is stored in the L2 cache m2. When the access target data is stored in the L2 cache m2, the cache controller reads out the data from the L2 cache m2. When the access target data is also not stored in the L2 cache m2, the cache controller reads out the access target data from the main memory 32. In addition, the cache controller stores the data read out from the main memory 32 in the L1 cache ma or mb, or the L2 cache m2.

As described above, in a case where the access target data is stored in the cache memory ma, mb, or m2 (referred to as a cache hit), the main memory 32 does not have to be accessed. The CPU 31 may access to the cache memory ma, mb, or m2 with a higher speed compared with the main memory 32. Therefore, when the access target data is stored in the L1 cache ma or mb, or the L2 cache m2, the performance of a process of the program is improved. In order to increase the cache hit rate of the access target data in the cache memories ma, mb, and m2, for example, a sector cache function is used. Next, the sector cache function is described with reference to FIG. 3.

Figure 3:
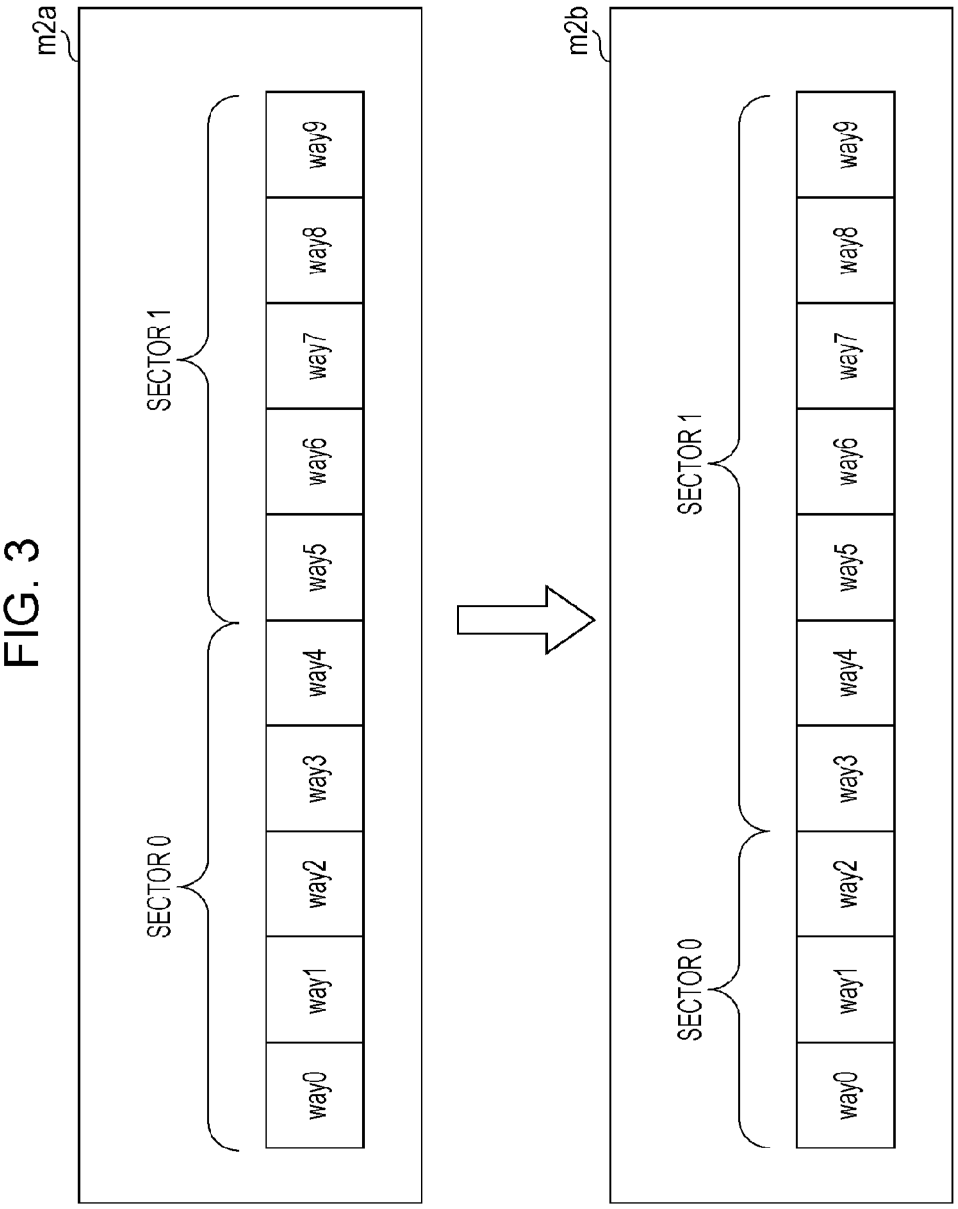
FIG. 3 is a diagram illustrating an example of a sector cache mechanism of the L2 cache m2, according to an embodiment.

FIG. 3 is a diagram illustrating an example of a sector cache mechanism of the L2 cache m2, according to an embodiment, which is illustrated in FIG. 2. The sector cache mechanism means a mechanism in which a user controls the cache memory through a program. The cache memory includes a plurality of sectors which are logically separated in accordance with a level of the reusability of stored data. As illustrated in FIG. 3, the same or different number of ways are assigned to each sector in accordance with a level of the reusability of stored data. The user may designate the sector causing the program to store data. With this, it is possible to reduce a case where data having high reusability is ejected from the cache memory due to generation of the access of data having low reusability. Hereinafter, the number of ways assigned to a sector will be also referred to as "a way count".

The L2 cache m2 of the embodiment is provided with a sector cache mechanism. In FIG. 3, the L2 cache m2 is illustrated as the L2 cache m2*a*. The L2 cache m2*a* of the embodiment has a sector 0 and a sector 1. The sector 0 represents a sector for storing data having low reusability, and the sector 1 represents a sector for storing data having high reusability. In a case where data is stored in the L2 cache m2*a*, the cache controller stores the data in the sector adapted to a level of the reusability of data (or access count). With this configuration, the access target data is highly likely to be stored in the L2 cache m2*a*, and thus it is possible to increase the cache hit rate.

The sector division ratio between the sector 0 and the sector 1 of the cache memory is defined by the number of ways (or a way count) assigned to each sector. In the embodiment, the number of ways, or a way count, represents the number of ways in a set associative method. The L2 cache m2 of the embodiment is a cache memory having 10 ways. The sector division ratio of the L2 cache m2*a* illustrated in the upper side of FIG. 3 is "sector 0:sector 1=5:5". A size of one way is, for example, 512 Kbytes.

Note that the L1 caches ma and mb as illustrated in FIG. 2 may be provided with the sector cache mechanism, but a case where only the L2 cache m2 is provided with the sector cache mechanism is described in the embodiment. In addition, the number of divisions of the sector is not limited to the example of FIG. 3. The L2 cache m2 may have three or more sectors.

The CPU 31 may change the sector division ratio during execution of the program. FIG. 3 illustrates a case where the sector division ratio of the L2 cache m2 is changed from "sector 0:sector 1=5:5" indicated in the L2 cache m2*a* to "sector 0:sector 1=3:7" indicated in the L2 cache m2*b*. For example, in a case where the data having high reusability and the size thereof are increased, as illustrated in FIG. 3, the cache hit rate of the data having high reusability is increased by extending an area (the number of ways) of the sector storing the data having high reusability (the sector 1 in the example of FIG. 3).

The information processing system of the embodiment optimizes the sector division ratio of the shared cache memory (the L2 cache) which the plurality of CPU cores ca and cb share and access while the plurality of CPU cores ca and cb included in the computation node 300 execute the plurality of jobs. With this, the performance at the time of execution of the plurality of jobs is improved. That is, an execution speed of the plurality of running jobs is improved.

Figure 4:
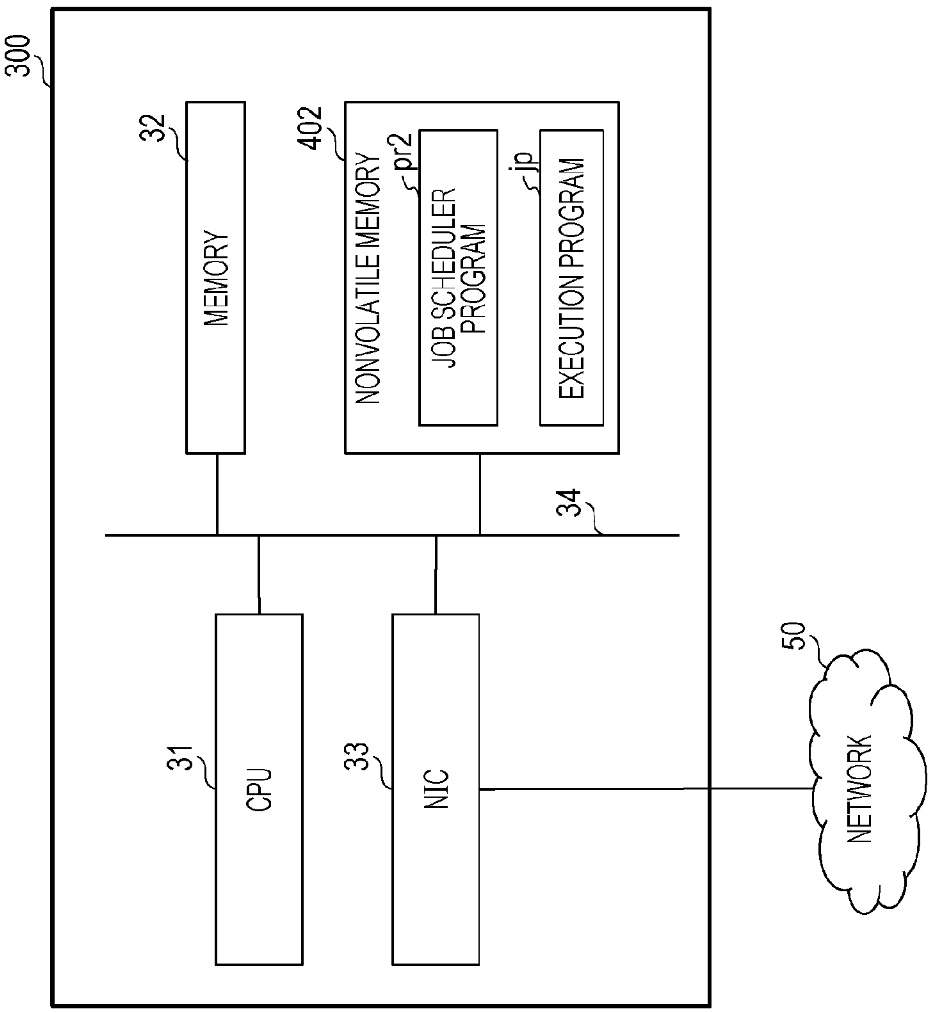
FIG. 4 is a diagram illustrating an example of a hardware configuration of a computation node, according to an embodiment.

FIG. 4 is a diagram illustrating an example of a hardware configuration of a computation node, according to an embodiment. The computation node 300 includes the CPU 31, the memory 32, and the NIC 33 as illustrated in FIGS. 1 and 2. In addition, the computation node 300 includes a nonvolatile memory 402. The nonvolatile memory 402 may be implemented by a hard disk drive (HDD), a nonvolatile semiconductor memory, or the like. Each unit is connected to each other via the bus 34.

The CPU 31 is connected to the memory 32, the nonvolatile memory 402, and the like via the bus 34, and executes a job execution process. The memory 32 stores data which is subjected to processing in the CPU 31. The nonvolatile memory 402 is provided with an area (not illustrated) which stores a program of an operating system (OS) executed by the CPU 31, an area pr2 which stores a job scheduler program of the computation node 300, and an area jp which stores an execution program of the job.

The job scheduler program (hereinafter, referred to as a job scheduler program pr2) stored in the job scheduler program area pr2 is executed by the CPU 31 to implement a job schedule process of the computation node 300 of the embodiment. In addition, an execution program (hereinafter, referred to as an execution program jp) which is stored in the execution program area jp of the job is executed by the CPU 31 to implement the job process. The NIC 33 controls transmission and reception of the data between the control node 100, the file server 600, or the like via the network 50.

Next, the hardware configuration of the control node 100 as illustrated in FIG. 1 will be described.

Figure 5:
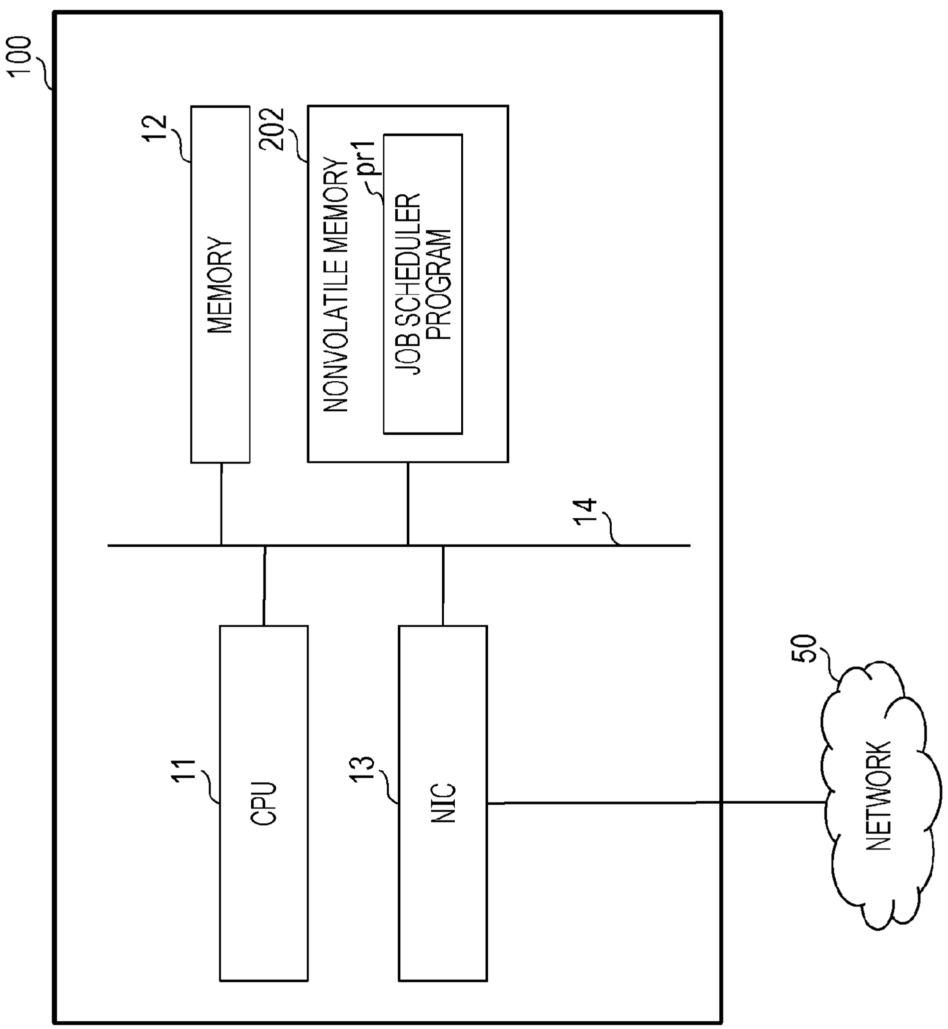
FIG. 5 is a diagram illustrating an example of a hardware configuration of a control node, according to an embodiment.

FIG. 5 is a diagram illustrating an example of a hardware configuration of a control node, according to an embodiment, which is illustrated in FIG. 1. The control node 100 includes the CPU 11, the memory 12, and the NIC 13 as illustrated in FIG. 1. The control node 100 includes a nonvolatile memory 202. The nonvolatile memory 202 may be implemented by the HDD, the nonvolatile semiconductor memory, and the like. Each unit is connected to each other via a bus 14.

The CPU 11 is connected to the memory 12 and the like via the bus 14, performs execution of the job schedule, and controls the entire control node 100. The memory 12 stores data which is subjected to processing in the CPU 11. The nonvolatile memory 202 is provided with an area (not illustrated) which stores the program of the operation system executed by the CPU 11, and an area pr1 which stores a job scheduler program of the control node 100 calculating the sector division ratio of the embodiment.

The job scheduler program (hereinafter, referred to as a job scheduler program pr1) is executed by the CPU 11 to implement the job schedule process of the control node 100 of the embodiment. In addition, the NIC 13 controls transmission and reception of data between the computation node 300, the compile node 500, and the file server 600 via the network 50.

In addition, in a manner similar to FIG. 5 which illustrates the configuration of the control node 100, the compile node 500 also includes the CPU 51, memory 52, NIC 53, and the nonvolatile memory. However, the compile node 500 stores a compile program in the nonvolatile memory. The compile program is executed by the CPU 51 to implement a compiling process of the embodiment.

Software Block Diagram of Information Processing System

Figure 6:
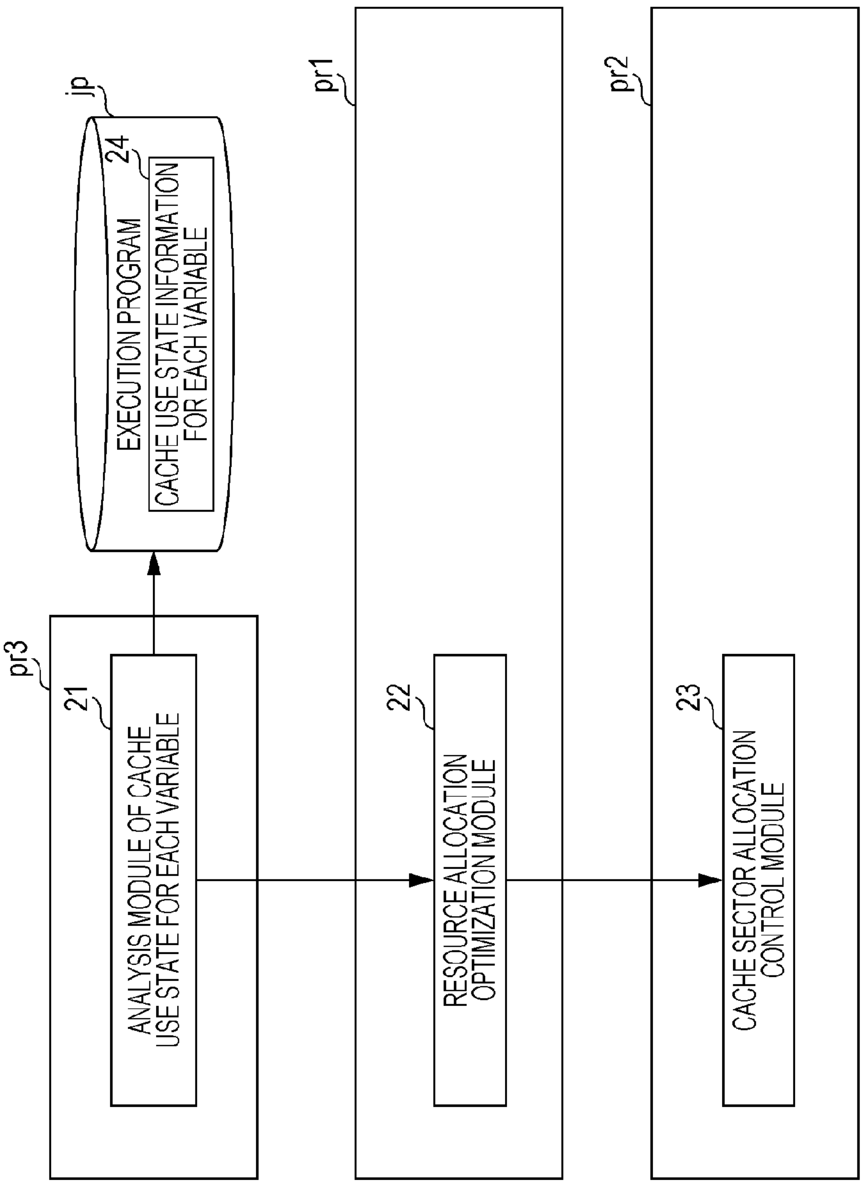
FIG. 6 is a diagram illustrating an example of a software block diagram of an information processing system, according to an embodiment.

FIG. 6 is a diagram illustrating an example of a software block diagram of an information processing system, according to an embodiment. The information processing system includes an analysis module 21 of a cache use state for each variable (hereinafter, referred to as an analysis module), a resource allocation optimization module 22, and a cache sector allocation control module 23. In addition, in the embodiment, a process of the information processing system includes a process of an analysis phase and a process of an execution phase. The process of the analysis module 21 corresponds to the analysis phase. Further, a process of the resource allocation optimization module 22 and a process of the cache sector allocation control module 23 correspond to the execution phase. An outline of each process of the modules will be described later with reference to FIG. 7.

The analysis module 21 is a module which is included in, for example, a compiler of the compile node 500 (FIG. 1) or a performance simulator (not illustrated) provided in the computation node 300 (FIG. 1). In addition, the resource allocation optimization module 22 is a module which is included in the job scheduler program pr1 of the control node 100 (FIG. 1). The cache sector allocation control module 23 is a module which is included in the job scheduler program pr2 of the computation node 300 (FIG. 1).

The analysis module 21 extracts cache use state information for each variable 24 by analyzing the execution program jp. The cache use state information for each variable 24 indicates a data access amount of the variable in which the memory access is generated in the execution program jp. The data access amount includes, for example, a size and access times (access count) of the variable. The analysis module 21 stores the extracted cache use state information for each variable 24 in another file which is associated with the execution program jp or the execution program jp.

In addition, the analysis module 21 embeds an optimization entry code into an upper end and embeds an optimization exit code into a lower end, of a target section for the optimization of the sector division ratio (hereinafter, referred to as an optimization section) in the execution program jp. The optimization entry code and the optimization exit code are control codes which call the resource allocation optimization module 22. The optimization section in the execution program jp is the target section for the optimization of the sector division ratio.

The optimization section corresponds to, for example, a process having a high influence rate on a processing time in the program. The process having a high influence rate on the performance means, for example, a loop process or a library function in which the data access amount exceeds a threshold value, among the loop process, the library function, or the like in the execution program jp. The analysis module 21 will be described in detail with reference to FIG. 9.

The resource allocation optimization module 22 of the control node 100 calculates the sector division ratio of the cache memory. The resource allocation optimization module 22 calculates, for example, the sector division ratio in which a processing delay time of the plurality of running jobs in the computation node 300 becomes the minimum. The processing delay time indicates a delay time which is estimated to be generated in the computation node 300. In response to detection of the optimization entry code of the running job by the computation node 300, the resource allocation optimization module 22 calculates the sector division ratio which is optimized to the plurality of running jobs. The resource allocation optimization module 22 calculates the sector division ratio based on the cache use state information for each variable 24 of the running execution program jp in the computation node 300 and a volume of a cache memory provided for the computation node 300. The process of the resource allocation optimization module 22 will be described in detail with reference to FIG. 12.

The cache sector allocation control module 23 of the computation node 300 changes the sector division ratio of the cache memory, based on the sector division ratio calculated by the resource allocation optimization module 22. The cache sector allocation control module 23 changes the sector division ratio, for example, by rewriting a value of a sector configuration register which manages the maximum number of ways for each sector. The sector configuration register is managed on a memory space of the operation system. A process of the cache sector allocation control module 23 will be described in detail with reference to FIG. 21.

Here, an outline of the optimization process of the sector division ratio in the information processing system of the embodiment is described.

Figure 7:
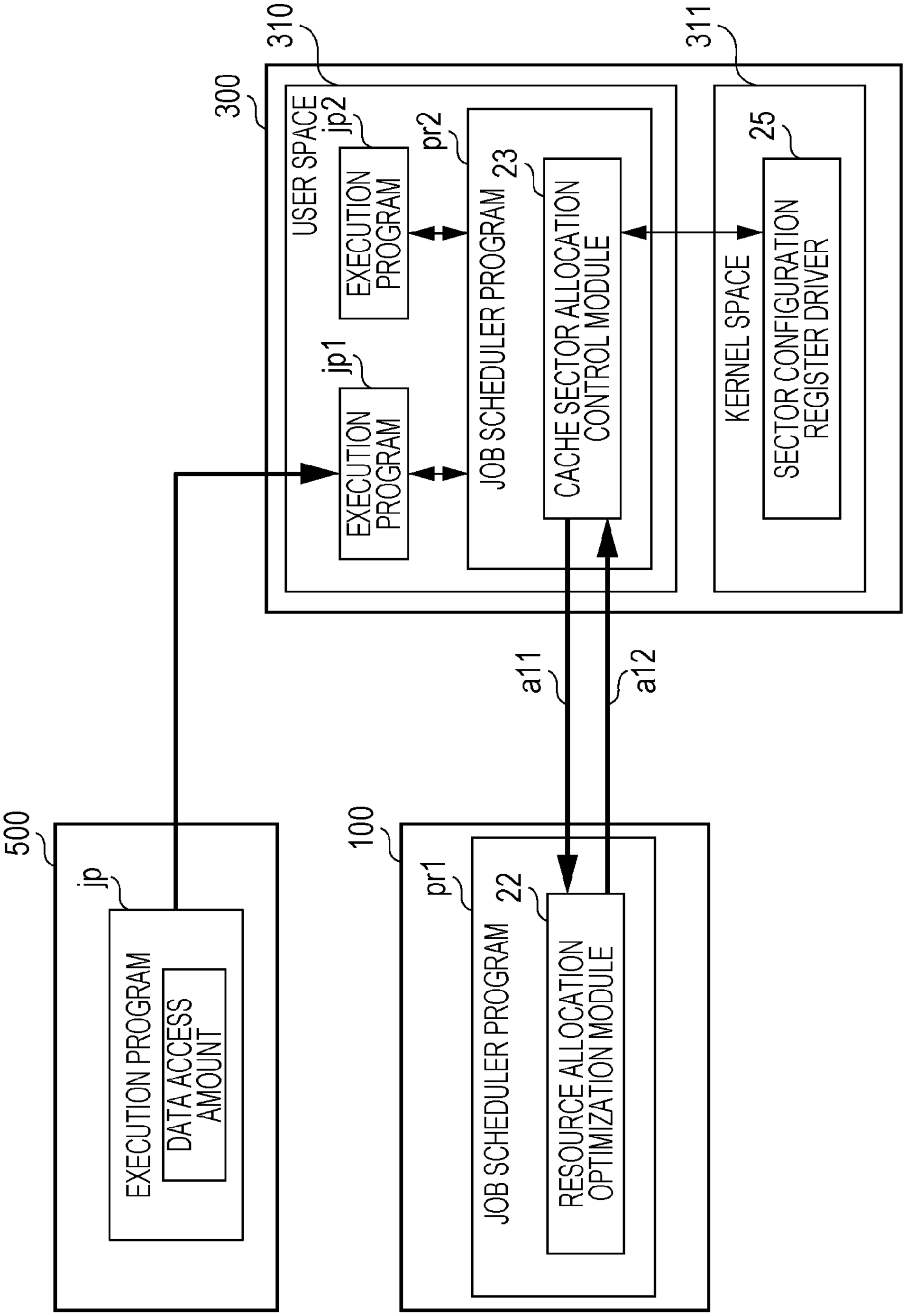
FIG. 7 is a schematic diagram illustrating an example of a process for optimizing a sector division ratio, according to an embodiment.

FIG. 7 is a schematic diagram illustrating an example of a process for optimizing a sector division ratio, according to an embodiment. As illustrated in FIG. 6, the process of the information processing system includes a process of the analysis phase and a process of the execution phase. In the analysis phase, the analysis module 21 of the compile node 500 (FIG. 6) generates a code for designating an optimization section and the program jp that includes cache use state information for each variable 24 (hereinafter, referred to as the data access amount information).

Typically, in a case where the sector division ratio is changed at the time of the job execution, for example, the designation of the sector division ratio is included in the execution program. Then, when executing the execution program, the designation of the sector division ratio which is included in the execution program is read out and the sector division ratio of the cache memory is changed. This method is effective in control of the sector division ratio with respect to a single job. In contrast, the computation node 300 of the embodiment calculates the optimal sector division ratio based on the plurality of execution jobs and a configuration of the cache memory of the computation node 300 during the execution program jp. Accordingly, in order to make the sector division ratio calculable, the execution program jp of the embodiment includes the code for designating the optimization section and a data access amount information 24 without the code designating the sector division ratio.

Next, in the execution phase, the resource allocation optimization module 22 and the cache sector allocation control module 23 in FIG. 6 execute a process in cooperation. In response to the detection of the optimization entry code during execution of execution programs (jobs) jp1 and jp2, the computation node 300 notifies the resource allocation optimization module 22 (FIG. 6) of the control node 100 of an instruction to calculate the sector division ratio (a11). In response to the notification, the resource allocation optimization module 22 calculates the sector division ratio of the computation node 300, based on the data access amount information of a plurality of execution programs jp1 and jp2 being executed in the computation node 300 and a volume of each sector of the L2 cache m2 of the computation node 300. That is, the resource allocation optimization module 22 calculates the sector division ratio so as to improve the performance of the plurality of execution programs jp1 and jp2 being executed in the computation node 300. Then, the resource allocation optimization module 22 transmits the calculated sector division ratio to the computation node 300 (a12).

The cache sector allocation control module 23 of the computation node 300 (FIG. 6) changes the sector configuration register based on the received sector division ratio. The cache sector allocation control module 23 operates on a user space 310 in the operating system, whereas the sector configuration register is operated on a kernel space 311 in the operating system. In addition, in the computation node 300 which executes the plurality of jobs, a privileged mode has to be used to change the sector configuration register in some cases. Accordingly, the cache sector allocation control module 23 changes a value of the sector configuration register by, for example, issuing the system call to the sector configuration register driver 25.

Then, the computation node 300 executes a process of codes (codes in the optimization section) from the optimization entry code to the optimization exit code. It takes a long time to execute the process of the codes in the optimization section in many cases. In addition, the process of the optimization section is a process on which the optimization of the sector division ratio has a high effect. Accordingly, even though it is required to execute a process for calculating the sector division ratio, the processing performance is improved due to the optimization of the sector division ratio, thereby reducing a time required for the process of the job.

Upon detecting the optimization exit code, the computation node 300 notifies the control node 100 of an end of the optimization section (a11). The resource allocation optimization module 22 notifies the computation node 300 of the sector division ratio before the optimization, in response to the end of the optimization section (a12). The cache sector allocation control module 23 changes the sector division ratio by issuing the system call in response to the notification of the sector division ratio. Subsequently, the computation node 300 executes a process for codes after the optimization section.

Figure 8:
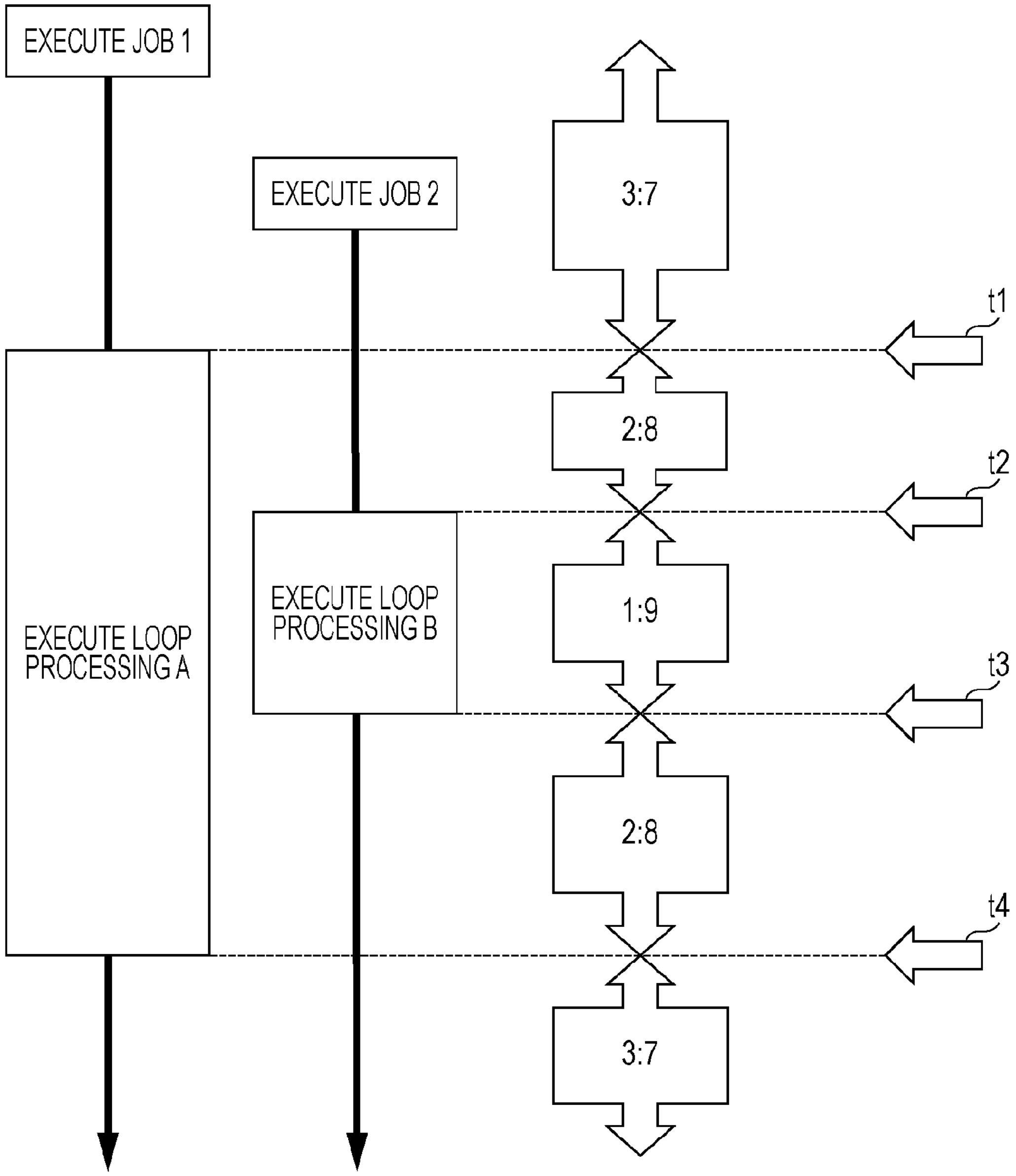
FIG. 8 is a diagram illustrating an example of a change in a division ratio of L2 cache m2 of a computation node, according to an embodiment.

FIG. 8 is a diagram illustrating an example of a change in a division ratio of L2 cache m2 of a computation node, according to an embodiment. In an example of FIG. 8, a first CPU core ca (FIG. 2) issues a job 1 (corresponding to the execution program jp1 in FIG. 7) and a second CPU core cb (FIG. 2) issues a job 2 (corresponding to the execution program jp2 in FIG. 7).

In addition, in the example of FIG. 8, after the first CPU core ca starts the execution of the job 1, the second CPU core cb executes the job 2. A loop process A and a loop process B are the processes of the optimization section. The loop process A starts the execution at a time t1 and ends that at a time t4. In addition, the loop process B starts the execution at a time t2 and ends that at a time t3. Therefore, the optimization of the sector division ratio of the L2 cache m2 is executed at the times t1 and t2.

In an example of FIG. 8, at the start time of the job 1, for example, the sector division ratio is set to be "sector 0:sector 1=3:7" as a default value. Then, at the time t1, the optimization process of the sector division ratio is executed in response to the start of the loop process A of the job 1, and the sector division ratio is changed from "sector 0:sector 1=3:7" to "sector 0:sector 1=2:8". In this case, an area of the sector 1 storing the data having high reusability is extended. With this, the performance when executing the process of the loop process A of the job 1 is improved.

In addition, at the time t2, the optimization process of the sector division ratio is executed in response to the start of the loop process B of the job 2, and the sector division ratio is changed from "sector 0:sector 1=2:8" to "sector 0:sector 1=1:9". At this time, the area of the sector 1 is further extended. Therefore, the performance when executing the process of the loop process A of the job 1 and the loop process B of the job 2 is improved. As described above, according to the embodiment, the sector division ratio of the shared cache memory is set to be a sector division ratio which is optimized to the plurality of running jobs, that is, a sector division ratio with the minimum processing delay time of the optimization section.

Then, when the loop process B of the job 2 ends (t3), the optimization section of the job 2 ends, and thereby the sector division ratio is changed from "sector 0:sector 1=1:9" to "sector 0:sector 1=2:8" before the start of the loop process B. This allows the sector division ratio to be reset at a value for improving the performance when executing the process of the loop process A of the job 1. In addition, when the loop process A of the job 1 ends (t4), the optimization section of the job 1 ends, and thereby the sector division ratio is changed from "sector 0:sector 1=2:8" to the original ratio of "sector 0:sector 1=3:7".

In this way, in the information processing system of the embodiment, the cache use state information for each variable (the data access amount) 24 and the codes indicating the optimization section are embedded into the execution program jp in advance. With this, in the information processing system, it is possible to calculate the sector division ratio, during the job execution, which is optimized to the plurality of jobs in accordance with the data access amount of the plurality of running jobs in the target computation node 300 and a configuration of the sector of the cache memory of the target computation node 300. Then, the target computation node 300 may improve the performance when executing the process of the plurality of jobs based on the optimal sector division ratio.

There are a large number of combinations of the plurality of jobs which are executed in parallel in the computation node 300. Whether or not each of the jobs is executed in parallel with any of jobs in the computation node 300 fluctuates depending on an operation of the system. In addition, it is not easy to extract all combinations of the jobs and then calculate the optimal sector division ratio with respect to each of the combinations before the job execution. In contrast, in the information processing system of the embodiment, the sector division ratio which is optimized to the plurality of jobs is calculated based on the data access amount of the plurality of jobs during the job execution. Accordingly, in the information processing system, it is possible to optimize the sector division ratio even in a case where a plurality of running jobs are in any combination, by calculating the sector division ratio of the shared cache memory which is optimal to the plurality of running jobs.

Further, the computation node 300 which executes the job fluctuates depending on an operation of the system. Therefore, when creating the execution program jp, it is not easy for the job to detect a configuration of the cache memory provided in the computation node 300 which is to be executed. The configuration of the cache memory represents, for example, the volume or the number of sectors of the cache memory, and the number of ways for each sector.

In addition, in a case where the generation of the CPU 31 of the computation node 300 is changed, while a fundamental function of the CPU 31 is the same as that before the change, the configuration of the cache memory may be changed in some cases. Further, in a large scale information processing system, the computation nodes 300 each provided with a different generation of CPU 31 may coexist in some cases. Therefore, when creating the execution program jp, it is not easy for the job to detect a configuration of the cache memory provided in the computation node 300 which is to be executed. Accordingly, when creating the execution program jp, it is not easy to detect the optimal sector division ratio with respect to all cases in advance.

In contrast, the information processing system of the embodiment calculates a sector division ratio which is optimized to the plurality of running jobs, and optimizes the sector division ratio during the job execution. Therefore, in the information processing system, it is possible to calculate the optimal sector division ratio in accordance with the plurality of running jobs and the configuration of the cache memory of the computation node 300 which executes the job. That is, in the information processing system, it is possible to improve the processing performance of the job even in a case where the running job is in any combination, or in a case of the computation node 300 including any configuration of the cache memory.

Subsequently, detailed description of the process of each module as illustrated in FIG. 6 and FIG. 7 will be made based on a flowchart. First, the process of the analysis module 21 of the analysis phase will be described.

Analysis Phase

Figure 9:
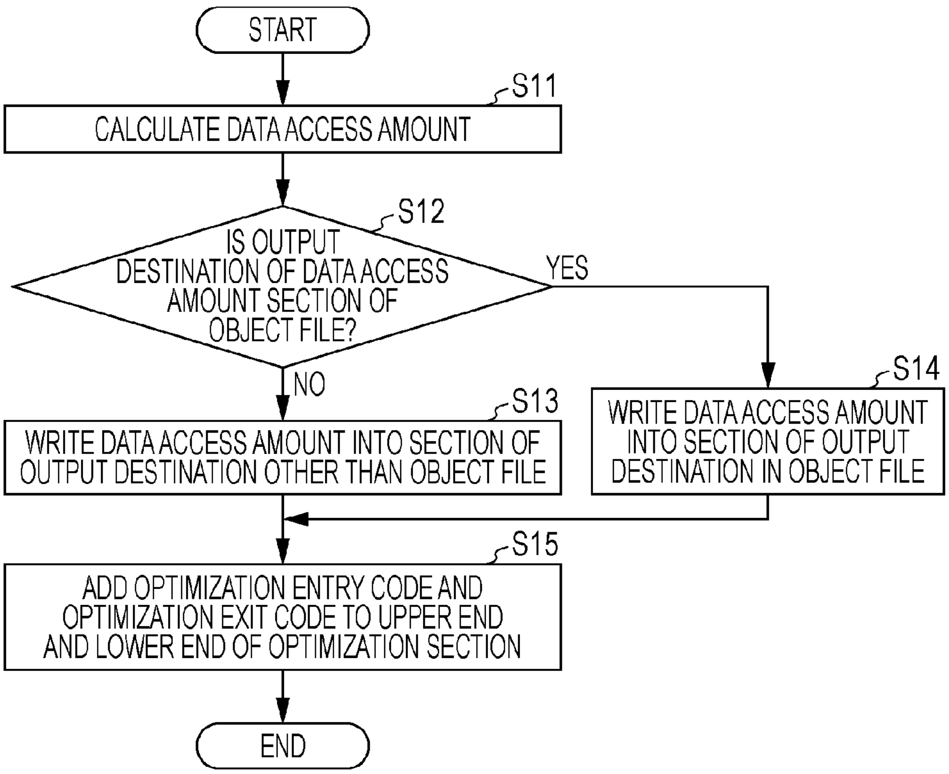
FIG. 9 is a diagram illustrating an example of an operational flowchart for a process of an analysis module, according to an embodiment.

FIG. 9 is a diagram illustrating an example of an operational flowchart for a process of an analysis module, according to an embodiment. The analysis module 21 of the compile node 500 analyzes the data access amount for each variable when the source program is compiled by a compiler. Then, the analysis module 21 calculates the data access amount in the program (S11).

The analysis module 21 may calculate the data access amount of all processes in a source program sp, or may calculate the data access amount of the loop process in the source program sp. Meanwhile, examples of processes, on which optimizing the sector division ratio is likely to have effect, include the loop process, and a library function which repeatedly accesses to the same data. Therefore, the analysis module 21 may calculate, for example, the data access amount for the loop process or the process of repeatedly accessing to the same data.

Meanwhile, in a case where the computation node 300 is provided with the performance simulator having a performance counter, the computation node 300 may execute the process in step S11. The performance simulator may collect the data access amount, for example, based on a value of the performance counter obtained when execution program jp is experimentally executed.

Next, the analysis module 21 determines whether or not an output destination of information on the data access amount is a section in an object file (S12). The object file is a file which is generated by compiling the source program. The information on the data access amount is, for example, designated in advance whether or not to be output to the section in the object file.

When the output destination of the data access amount is the section in the object file (YES in S12), the analysis module 21 writes the data access amount (the cache use state information for each variable in FIG. 6) 24 into the section of output destination in the object file (S14). On the other hand, when the output destination of the data access amount is not the section in the object file (NO in S12), the analysis module 21 writes the data access amount (the cache use state information for each variable in FIG. 6) 24 into a section in a file other than the object file (S13).

FIG. 10 is a diagram illustrating an example of cache use state information for each variable, according to an embodiment. Table H1 includes, for each variable, information of an optimization section identification (ID), an address, the number of times, and a size. One execution program jp includes one or more of the optimization sections. Therefore, the optimization section ID identifies a optimization section to which the variable belongs. The address represents a memory address at which the variable is stored. The address represents one of addresses of, for example, a heap area, a stack area, and an area which is secured in accordance with a system call mmap. In addition, the number of times represents the access times (access count) to the memory space, and the size represents a size of the variable (byte).

The data access amount of one optimization section (optimization section ID=123) is indicated in an example of Table H1. According to Table H1, the variable in the first line indicates information of the variable which is accessed in the optimization section of the ID "123", the number of access times are "1024" times, the size is "2048" byte, and the address is "0x00000811e7c53430". In addition, the variable in the second line indicates information of the variable which is accessed in the optimization section of the ID "123", the number of access times are "256" times, the size is "2048" byte, and the address is "0x00001611e7c53000". The same is true for other variables.

Returning to FIG. 9, the analysis module 21 adds the optimization entry code and the optimization exit code to the upper end and the lower end of the optimization section in the source program sp, respectively (S15). For example, the user designates an arbitrary group of codes in the source program sp as an optimization section. For example, the user determines an optimization section while tuning it by trial and error. With this, it is possible to optionally designate a process range within the source program sp, on which the optimization of the sector division ratio has particularly high effect, as the optimization section in advance.

Figure 11:
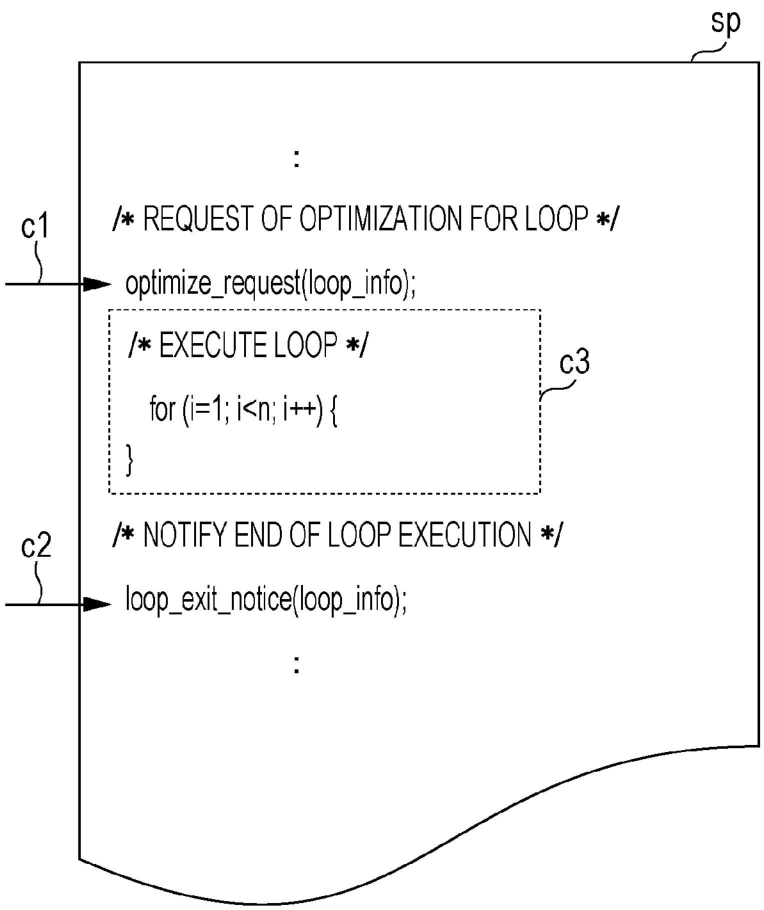
FIG. 11 is a diagram illustrating an example of a source program into which an optimization entry code and an optimization exit code are inserted, according to an embodiment.

FIG. 11 is a diagram illustrating an example of a source program into which an optimization entry code and an optimization exit code are inserted, according to an embodiment. The source program sp illustrated in FIG. 11 includes a optimization entry code c1, an optimization exit code c2, and a code group c3 indicating the loop process. In an example of FIG. 11, the code group c3 is the optimization section. In addition, in the example of FIG. 10, the optimization entry code c1 is codeoptimize_request (loop_info);, and the optimization exit code c2 is codeloop_exit_notice (loop_info);. A parameter loop_info of the optimization entry code c1 and the optimization exit code c2 indicates, for example, the data access amount of the optimization section.

The analysis module 21 may detect the loop process or the code group (for example, the library function or the like) in which the data access amount is greater than a threshold value among the codes in the source program sp, as an optimization section. The loop process or the code group in which the data access amount is greater than the threshold value has a high influence on the processing time in the program, which is caused by optimizing the sector division ratio.

After executing the steps illustrated in FIG. 9, the compiler of the compile node 500 compiles the source program sp into which the optimization entry code and the optimization exit code are embedded so as to generate the object file including information on the data access amount. In addition, a linker program (not illustrated) of the compile node 500 generates an execution program jp by linking one or more of object files.

Execution Phase

Next, a process of the execution phase will be described. In the execution phase, during job execution, the resource allocation optimization module 22 and the cache sector allocation control module 23, illustrated in FIGS. 6 and 7, execute the processes in cooperation. First, a flow of the process of the execution phase will be described with reference to a flowchart.

Figure 12:
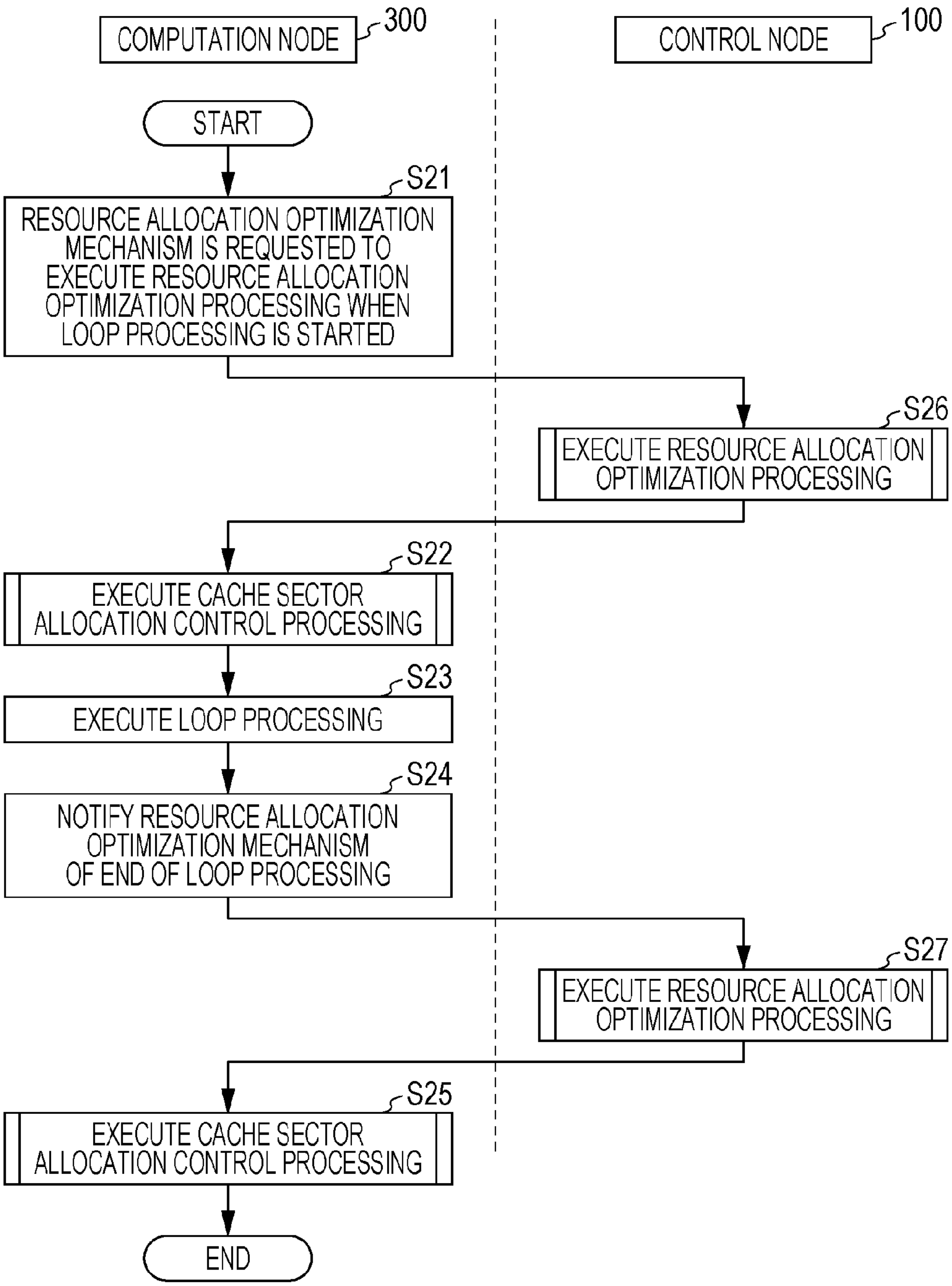
FIG. 12 is a diagram illustrating an example of an operational flowchart for a process of an execution phase, according to an embodiment.

FIG. 12 is a diagram illustrating an example of an operational flowchart for a process of an execution phase, according to an embodiment. The computation node 300 of the cache sector allocation control module 23 requests the control node 100 to execute the process when the optimization entry code (optimize_request (loop_info); in FIG. 11) is detected (all in FIG. 7) during the job execution (S21). The optimization entry code corresponds to the time t1 and t2 in the example of FIG. 8. The resource allocation optimization module 22 of the control node 100 executes the resource allocation optimization process in response to the request from the computation node 300 (S26). Detailed description of the resource allocation optimization process which corresponds to step S26 will be made later with reference to a flowchart in FIG. 13. The resource allocation optimization module 22 notifies the computation node 300 of the sector division ratio as a result of the process of the resource allocation optimization.

Then, the cache sector allocation control module 23 of the computation node 300 executes a cache sector allocation control process based on the notified sector division ratio (S22). Detailed description of the cache sector allocation control process will be made later with reference to a flowchart in FIG. 21. Then, the computation node 300 executes the loop process (the process of the optimization section) (S23).

After the loop process, when detecting the optimization exit code (loop_exit_notice (loop_info); and FIG. 11) (a12 in FIG. 7), the cache sector allocation control module 23 notifies the control node 100 of the end of the optimization section (S24). The optimization exit code corresponds to the time t3 and t4 in the example of FIG. 8. The resource allocation optimization module 22 of the control node 100 executes the resource allocation optimization process in response to the notification from the computation node 300 (S27). Detailed description of the resource allocation optimization process corresponding to step S27 will be made with reference to a flowchart in FIG. 15. The resource allocation optimization module 22 notifies the computation node 300 of the sector division ratio as the result of process of the resource allocation optimization. Then, in the same way, the cache sector allocation control module 23 of the computation node 300 executes the cache sector allocation control process based on the notified sector division ratio. (S25).

Flowchart: Resource Allocation Optimization Process

Figure 13:
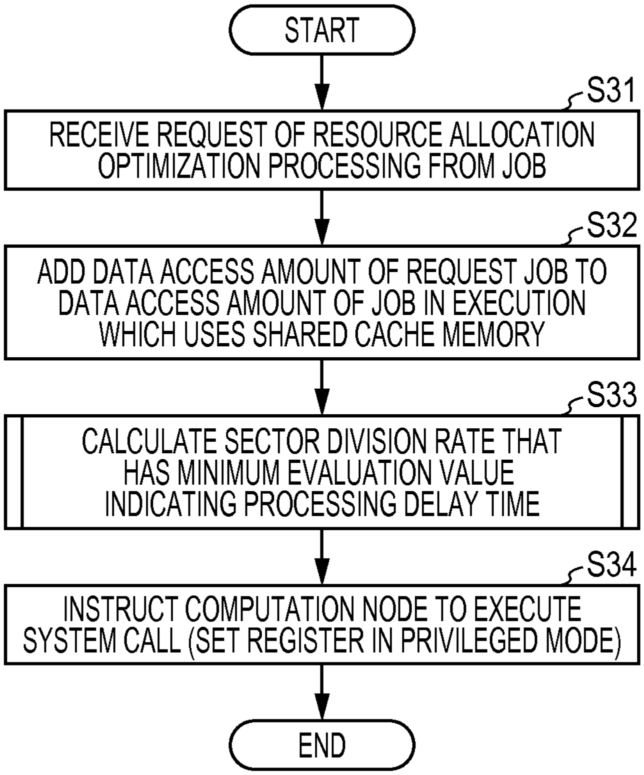
FIG. 13 is a diagram illustrating an example of an operational flowchart for a resource allocation optimization process, according to an embodiment.

FIG. 13 is a diagram illustrating an example of an operational flowchart for a resource allocation optimization process, according to an embodiment, which is illustrated at S26 in FIG. 12. The resource allocation optimization module 22 receives the request of the resource allocation optimization process from the computation node 300 (S31). At this time, the resource allocation optimization module 22 receives the data access amount of the target optimization section, out of the cache use state information for variables 24 of the running job (hereinafter, referred to as a requested job), from the computation node 300.

Next, the resource allocation optimization module 22 adds the received data access amount of the optimization section to the data access amount of the running jobs which use the shared cache memory of the computation node 300 (S32). With this, the resource allocation optimization module 22 calculates a total data access amount of the running jobs which use the shared cache memory. The resource allocation optimization module 22 adds the data access amount in the target optimization section of the requested job to the data access amount of the optimization section in a case where another running job in the computation node 300 is executing the process of the optimization section.

FIG. 14 is a diagram illustrating an example of a total data access amount of running jobs using a shared cache memory, according to an embodiment, which is updated in step S32. Table H2 illustrates an example of a total data access amount of the running jobs which use the shared cache memory, which is updated at the time t2 in FIG. 8. In Table H2, each line d1 of the optimization section ID "212" corresponds to the loop process A of the job 1. In addition, each line d2 of the optimization section ID "123" corresponds to the loop process B of the job 2. That is, at the time t2, the resource allocation optimization module 22, as illustrated in Table H2, adds the data access amount of the loop process B (d2) which is newly started to the data access amount of the running loop process A (d1) (S32).

Meanwhile, in a case where another running job in the same computation node 300 is not executing the process of the optimization section, the resource allocation optimization module 22 may calculate the data access amount of another running job based on the data access amount in a section other than the optimization section of the cache use state information for variables 24 of the requested job. Alternatively, in a case where a mechanism for measuring performance is built in the CPU 31 of the computation node 300, the resource allocation optimization module 22 may calculate the data access amount of the another running job based on the data access amount which is measured by the mechanism for measuring performance. The resource allocation optimization module 22 adds the data access amount in the target optimization section of the requested job to the data access amount of the calculated another running job.

Returning to the flowchart in FIG. 13, the resource allocation optimization module 22 calculates the sector division ratio based on the data access amount which is updated in step S32 and the volume of the cache memory (S33). The resource allocation optimization module 22 calculates, for example, the sector division ratio so that a value of a function evaluating the processing delay time due to the cache miss becomes minimum. Detailed description of the process will be made with reference to FIGS. 16 to 20. Then, the resource allocation optimization module 22 notifies the computation node 300 of the sector division ratio, and instructs the computation node 300 to execute the system call which reflects the sector division ratio (S34).

Figure 15:
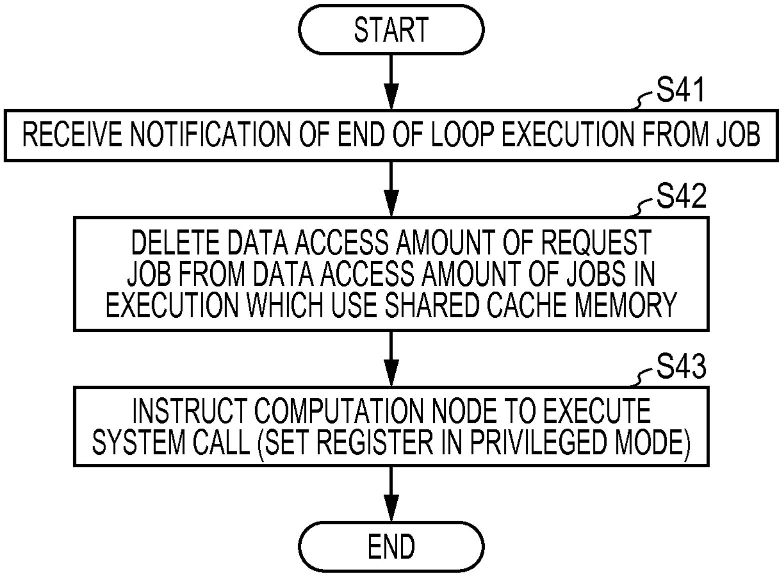
FIG. 15 is a diagram illustrating an example of an operational flowchart for a resource allocation optimization process (S27) illustrated in FIG. 12.

FIG. 15 is a diagram illustrating an example of an operational flowchart for a resource allocation optimization process, according to an embodiment, which is illustrated in FIG. 12 (S27). The resource allocation optimization module 22 receives the notification of the end of the loop process of the requested job from the computation node 300 (S41). Next, the resource allocation optimization module 22 deletes the data access amount of the requested job from a total data access amount of the running job which uses the shared cache memory (S42). For example, in the example of Table H2 as illustrated in FIG. 14, at the time t3 in FIG. 8, the resource allocation optimization module 22 deletes information corresponding to each line d2 of the optimization section ID "123".

Next, the resource allocation optimization module 22 notifies the computation node 300 of the sector division ratio which is calculated before executing the optimization section, and instructs the computation node 300 to execute the system call which reflects the sector division ratio (S43). Meanwhile, at this time, in the same way in step S33 of FIG. 13, the resource allocation optimization module 22 may calculate the sector division ratio based on the total data access amount of the running jobs which use the shared cache memory, which is updated in step S42. With this, the resource allocation optimization module 22 may recalculate the optimal sector division ratio at each time the total data access amount of the running jobs using the shared cache memory is changed.

Calculation of Sector Division Ratio (S33 in FIG. 13)

Figure 16:
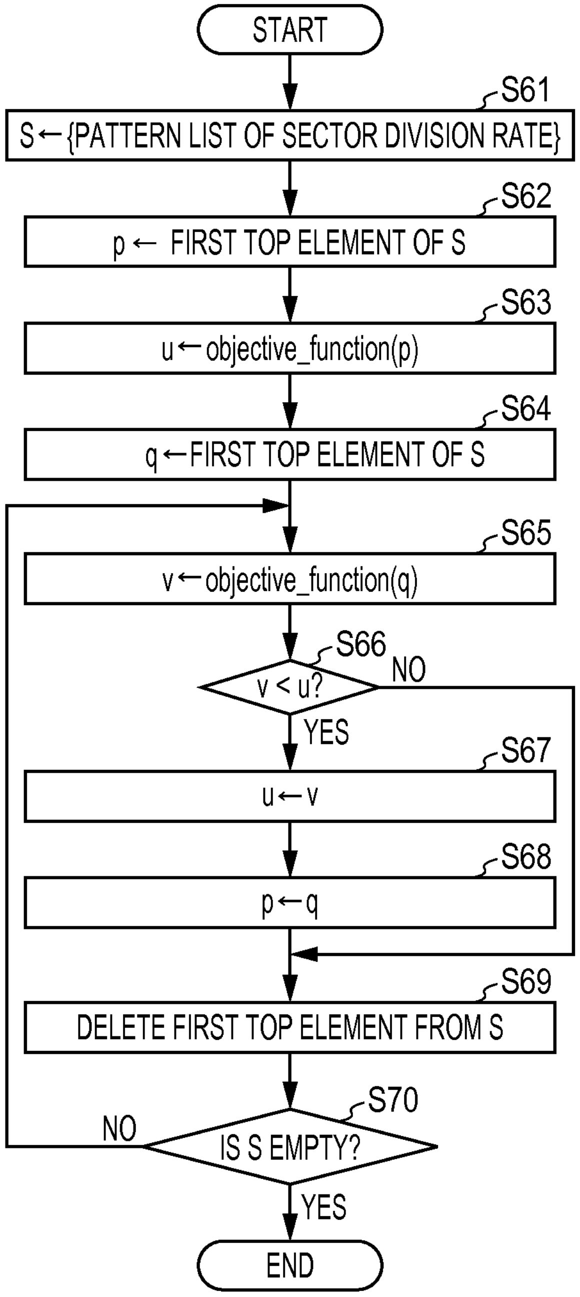
FIG. 16 is a diagram illustrating an example of an operational flowchart for a calculation process of the sector division ratio (S33 in FIG. 13) , according to an embodiment.

FIG. 16 is a diagram illustrating an example of an operational flowchart for a calculation process of a sector division ratio, according to an embodiment, which is illustrated at S33 in FIG. 13. In the calculation process of the sector division ratio, the evaluation value indicating the processing delay time is calculated for each pattern of the sector division ratio. Then, among a plurality of patterns, a pattern having the minimum evaluation value indicating the processing delay time is selected.

First, the resource allocation optimization module 22 extracts a pattern list S of the sector division ratios which are candidates (S61). As illustrated in FIG. 2, the L2 cache m2 of the embodiment is configured to include 10 ways. Accordingly, the pattern list S includes, for example, "sector 0:sector 1=1:9", "sector 0:sector 1=2:8", "sector 0:sector 1=3:7", "sector 0:sector 1=4:6", "sector 0:sector 1=5:5", "sector 0:sector 1=6:4", "sector 0:sector 1=7:3", "sector 0:sector 1=8:2", and "sector 0:sector 1=9:1". Here, the embodiment is not limited thereto, but among the above-described patterns, some patters may be employed.

Next, the resource allocation optimization module 22 sets a first top element (pattern) of the extracted pattern list S to the variable p (S62). The first top element is, for example, the sector division ratio "sector 0:sector 1=1:9". The resource allocation optimization module 22 calculates the evaluation value u indicating the processing delay time by executing a function objective_function (p) (S63). That is, the resource allocation optimization module 22 calculates the evaluation value (value u) indicating the processing delay time in a case where the sector division ratio which is "sector 0:sector 1=1:9" (a value p) is employed. Description of the process of the function objective_function will be made with reference to flowcharts in FIGS. 18 and 20.

Next, the resource allocation optimization module 22 sets a second top element of the extracted pattern list S to a variable q (S64). The second top element is, for example, the sector division ratio "sector 0:sector 1=2:8". Then, the resource allocation optimization module 22 calculates the evaluation value v indicating the processing delay time by executing the function objective_function (q) (S65). That is, the resource allocation optimization module 22 calculates the evaluation value (value v) indicating the processing delay time in a case where the sector division ratio which is "sector 0:sector 1=2:8" (value q) is employed.

Then, the resource allocation optimization module 22 compares the value u (S63) which is calculated based on the first top element "sector 0:sector 1=1:9" (the value p) and the value v (S65) which is calculated based on the second top element "sector 0:sector 1=2:8" (the value q) (S66). When the value v is smaller than the value u (YES in S66), the evaluation value (v) which indicates the processing delay time and is calculated based on the second top element q is smaller than the evaluation value (u) which indicates the processing delay time and is calculated based on the first top element p. In this case, the resource allocation optimization module 22 sets the value v to the value u (S67). In addition, the resource allocation optimization module 22 updates the variable p indicating the first top element of the patterns, from the value of the first top element p to the value of the second top element q (S68). That is, the resource allocation optimization module 22 sets the second element "sector 0:sector 1=2:8" as the element p whose evaluation value indicating the processing delay time is minimum.

On the other hand, when the value v is equal to or greater than the value u (NO in S66), the evaluation value (v) which indicates the processing delay time and is calculated based on the second top element q is equal to or greater than the evaluation value (u) which indicates the processing delay time and is calculated based on the first top element p. In this case, the resource allocation optimization module 22 does not execute the process of step S67 and S68. That is, the resource allocation optimization module 22 maintains the first top element "sector 0:sector 1=1:9" as the element p whose evaluation value indicating the processing delay time is minimum. Then, the resource allocation optimization module 22 deletes the first top element from the pattern list S (S69).

While there remains an element in the pattern list S, the resource allocation optimization module 22 repeatedly executes the process of step S65 to S69. As a result, the element p becomes an element (a sector division ratio) whose evaluation value indicating the processing delay time is minimum among the candidates of the sector division ratios included in the pattern list S. The resource allocation optimization module 22 selects the sector division ratio of the element p as the optimal sector division ratio.

Function Objective_Function

Figure 17:
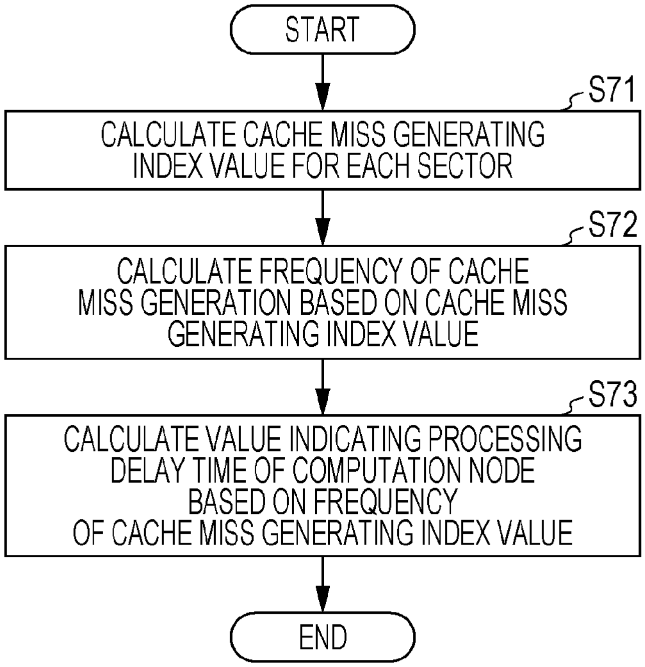
FIG. 17 is a diagram illustrating an example of an operational flowchart for a process of a function objective_function, according to an embodiment.

FIG. 17 is a diagram illustrating an example of an operational flowchart for a function objective_function, according to an embodiment, which is illustrated in steps S63 and S65 of FIG. 16. The function objective_function is configured to calculate an evaluation value indicating the processing delay time of the plurality of jobs in the computation node 300 by using an element (a sector division ratio) as input.

First, the function objective_function calculates a cache miss generating index value for each sector, based on the data access amount of the plurality of jobs and volume of the cache memory (S71). Detailed description of the process in step S71 will be made with reference to FIGS. 18 to 20.

Next, the function objective_function is used to calculate the frequency of the cache miss, based on the cache miss generating index value for each sector (S72). The function objective_function calculates the frequency of the cache miss by applying a coefficient to the cache miss generating index value. A contribution ratio to the frequency of the cache miss of the cache miss generating index value is different for each sector. Accordingly, the function objective_function is used to properly calculate the frequency of the cache miss by applying the coefficient having different weight for each sector to the cache miss generating index value. Detailed description of the process will be made later.

Next, the function objective_function is used to calculate the evaluation value indicating the processing delay time in the computation node 300, based on the frequency of the cache miss (S73). Meanwhile, in a case where the computation node 300 includes a cache memory having a plurality of hierarchies, the function objective_function is used to calculate the frequency of the cache miss in each hierarchy of the cache memory. Then, the function objective_function is used to calculate the processing delay time in the computation node 300 by applying the coefficient having a different weight in each hierarchy to the frequency of the cache miss of the each hierarchy. Due to this, the function objective_function is used to calculate the processing delay time of the computation node 100 with high accuracy.

Figure 18:
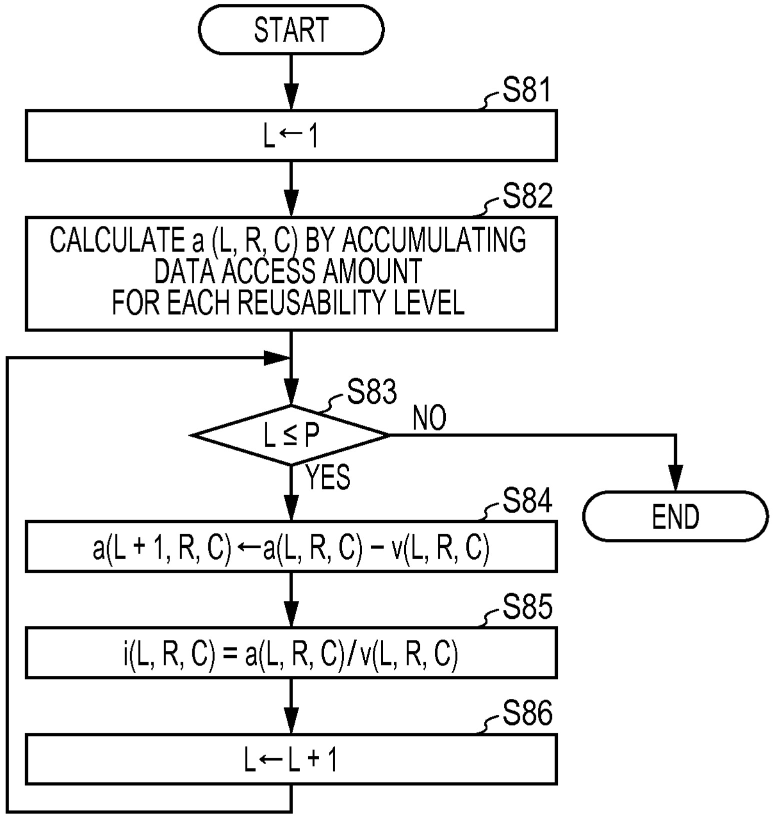
FIG. 18 is a diagram illustrating an example of an operational flowchart for a calculation process of a cache miss generating index value of an L1 cache which is built in the CPU core, according to an embodiment.

Next, the description of the calculation process of the cache miss generating index value will be made based on FIGS. 18 to 20. The flowcharts in FIGS. 18 and 20 are a flowchart in which the cache miss generating index value is calculated in each hierarchy in a case where the computation node 300 includes the shared cache memory having the plurality of hierarchies. In addition, FIGS. 18 and 20 illustrate the calculation process of the cache miss generating index value in a case where each cache memory in each hierarchy includes a plurality of sectors. Here, as described above, in the example of FIG. 2, the L1 caches ma and mb are not provided with the sector cache mechanism. Therefore, in the process of the L1 caches ma and mb (FIG. 18), it is assumed that, for example, the sector division ratio of the L1 caches ma and mb is a predetermined default value (for example, "sector 0:sector 1=5:5") in the resource allocation optimization module 22.

FIG. 18 is a diagram illustrating an example of an operational flowchart for a calculation process of a cache miss generating index value of L1 caches ma and mb which are built in a CPU core, according to an embodiment. The resource allocation optimization module 22, first, sets a variable L representing a cache level as a value "1" (S81). In the embodiment, as illustrated in FIG. 2, a case where the variable L is set at value "1" represents the L1 caches ma and mb, and a case where the variable L is set at value "2" represents the L2 cache m2.

Next, the resource allocation optimization module 22 calculates a data access amount a(L,R,C) for each reusability level of data (S82), where the variable C represents identification information of the CPU core. In the embodiment, the CPU (FIG. 2) includes two CPU cores ca and cb. Accordingly, the variable C represents value "1" and value "2". In addition, the variable R represents the reusability level of data. In the embodiment, the reusability level of the variable whose access count is 255 or less is set at "1", and the reusability level of the variable whose access count is greater than 255 is set at "2". Therefore, the variable R represents value "1" or value "2". Meanwhile, the reusability level "R=1" corresponds to the sector 0, and reusability level "R=2" corresponds to the sector 1. The variable L represents the level of the cache memory.

Specifically, the resource allocation optimization module 22 calculates the data access amount a(L,R,C) (=a(1,1,1), a(1,2,1)) for each of the L1 caches ma and mb ("L=1"), the CPU core ca ("C=1"), and the reusability level "R=1" (corresponding to the sector 0) and "R=2" (corresponding to the sector 1). In addition, the resource allocation optimization module 22 calculates the data access amount a(L,R,C) (=a(1,1,2), a(1,2,2)) for each the L1 caches ma and mb ("L=1"), the CPU core cb ("C=2"), and the reusability level "R=1" (corresponding to the sector 0) and "R=2" (corresponding to the sector 1).

Figure 19:
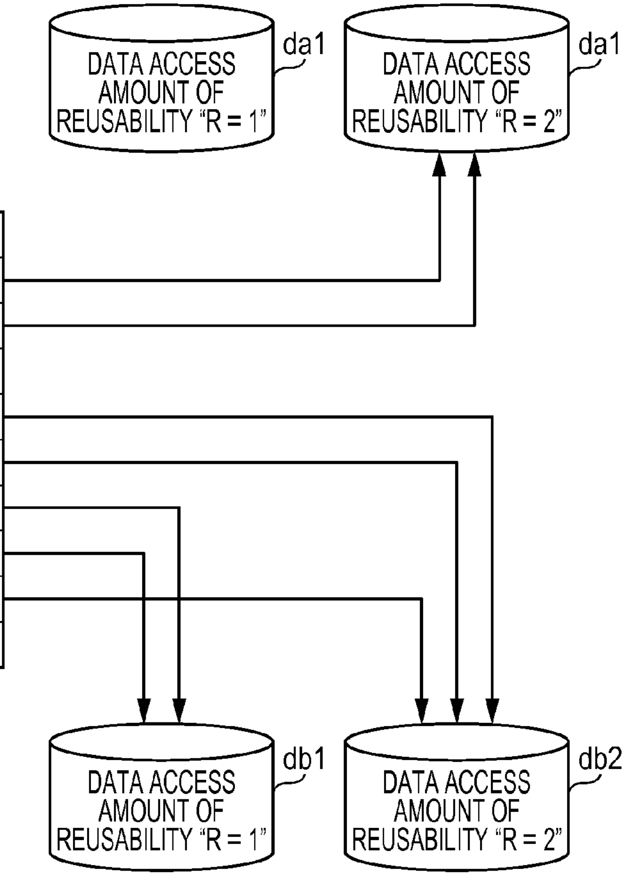
FIG. 19 is a diagram illustrating an example of a calculation process of the data access amount of the L1 cache, according to an embodiment.
Figure 20:
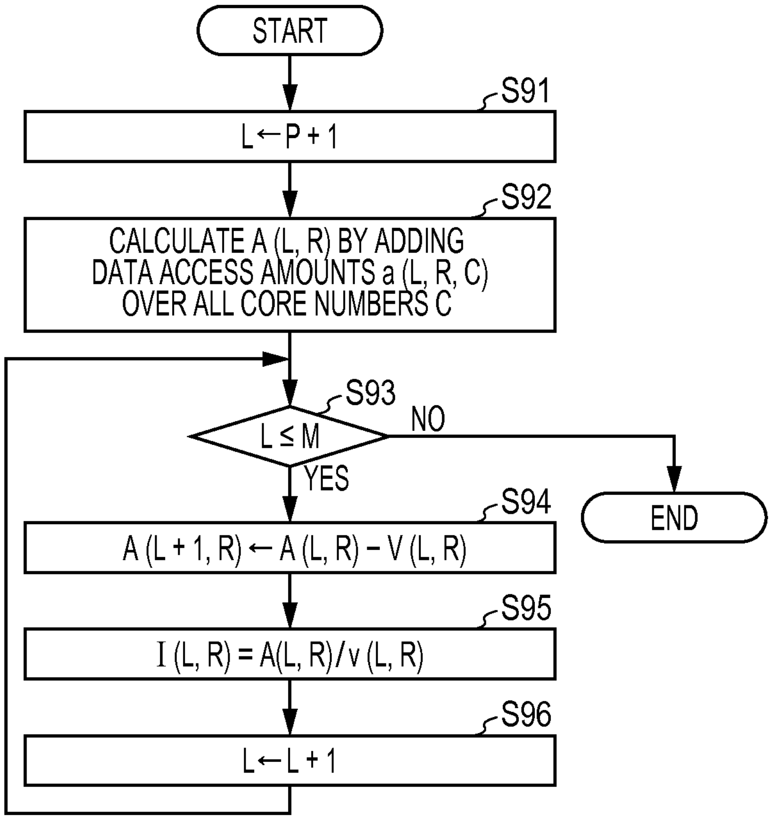
FIG. 20 is a diagram illustrating an example of an operational flowchart for a calculation process of a cache miss generating index value of the shared cache memory, according to an embodiment.

FIG. 19 is a diagram illustrating an example of data access amount a(L,R,C) of L1 caches ma and mb, according to an embodiment. The resource allocation optimization module 22 calculates the data access amount of the L1 caches ma and mb, based on the total data access amount (S32 in FIG. 13, Table H2 in FIG. 14) of the running jobs using the shared cache memory as illustrated in Table H2. Table H2 of FIG. 19 is the same as Table H2 illustrated in FIG. 14.

For example, the optimization section ID "212" in Table H2 represents the process of the CPU core ca (FIG. 2) ("CPU=1"), and the optimization section ID "123" represents the process of the CPU core cb (FIG. 2) ("CPU=2"). The CPU core ca corresponds to the L1 cache ma, and the CPU core cb corresponds to the L1 cache mb. In addition, as described above, a variable whose access count is 255 or less corresponds to the reusability level "R=1", and a variable whose access count is greater than 255 corresponds to the reusability level "R=2".

The access count of the variable of the optimization section ID "212" in a first line of Table H2 is "1024", and corresponds to the reusability level "R=2". Therefore, the resource allocation optimization module 22 adds the variable size "1024" bytes in the first line to the corresponding data access amount da2 (a(1,2,1)) of the reusability level "R=2" of the L1 cache ma. In the same way, from the fact that the access count of the variable in the second line is "256", the resource allocation optimization module 22 adds the variable size "2048" bytes to the corresponding data access amount da2 (a(1,2,1)) of the reusability level "R=2" of the L1 cache ma.

In addition, from the fact that the access count of the optimization section ID "123" of the variable in a fourth line is "1024", the resource allocation optimization module 22 adds the variable size "2048" bytes to the corresponding data access amount db2 (a(1,2,2)) of the reusability level "R=2" of the L1 cache mb. The same is true for other variables. In addition, from the fact that the access count of the optimization section ID "123" of the variable in a sixth line is "1", the resource allocation optimization module 22 adds the variable size "100" bytes to the corresponding data access amount db1 (a(1,1,2)) of the reusability level "R=1" of the L1 cache mb.

As described above, the resource allocation optimization module 22 sums up the sizes of the variables according to the reusability level of all the variables in the computation node 300. With this, the resource allocation optimization module 22 calculates the data access amount a(1,1,1) of the reusability level "R=1" of the L1 cache ma, the data access amount a(1,2,1) of the reusability level "R=2" of the L1 cache ma, the data access amount a(1,1,2) of the reusability level "R=1" of the L1 cache mb, and the data access amount a(1,2,2) of the reusability level "R=2" of the L1 cache mb.

Returning to FIG. 18, next, the resource allocation optimization module 22 determines whether or not a variable L is equal to or smaller than a variable P (S83). The variable P represents the maximum level of the cache memory built in the CPU core. In the embodiment, the cache memories built in the CPU core only include the L1 caches ma and mb. Therefore, the variable P represents the value "1". At a time of the first loopn, the variable L represents the value "1", and it is determined that the variable L is equal to or smaller than the variable P (YES in S83). That is, the resource allocation optimization module 22 continues the process in a case where the cache memory in the execution of the process is the cache memory which is built in the CPU core.

Next, the resource allocation optimization module 22 calculates the data access amount a(L+1,R,C) of the next hierarchy level (L=L+1) (S84). That is, the resource allocation optimization module 22 calculates the data access amount a(L,R,C) (=(2,1,1), a(2,2,1), a(2,1,2), a(2,2,2)) of the L2 cache m2. The resource allocation optimization module 22 calculates the data access amount which overflows the volume of the L1 caches ma or mb as the data access amount of the L2 cache m2.

Specifically, the resource allocation optimization module 22 calculates the data access amount of the L2 cache m2 by subtracting volume V(L,C) (=V(1,1), V(1,2)) for each sector of the L1 caches ma and mb from the data access amounts a(1,1,1), a(1,2,1), a(1,1,2), and a(1,2,2) of the L1 caches ma and mb, which are calculated in step S82. The volume V(1,1) represents the volume of the L1 cache ma and the volume V(1,2) represents the volume of the L1 cache mb.

As described above, the L1 caches ma and mb in the example of FIG. 2 are not provided with the sector cache mechanism. In this case, the resource allocation optimization module 22 calculates the volume v(L,R,C) (=v(1,1,1), v(1,2,1), v(1,1,2), v(1,2,2)) for each sector, for example, by assuming that the sector division ratio of the L1 caches ma and mb is "sector 0:sector 1=5:5". The volume v(1,1,1) represents the volume of the sector 0 ("R=0") of the L1 cache ma, and volume v(1,2,1) represents the volume of the sector 1 ("R=1") of the L1 cache ma. In the same way, the volume v(1,1,2) represents the volume of the sector 0 ("R=0") of the L1 cache mb, and the volume v(1,2,2) represents the volume of the sector 1 ("R=1") of the L1 cache mb.

Then, the resource allocation optimization module 22 calculates the data access amount of the L2 cache m2 by subtracting the volumes v(1,1,1), v(1,2,1), v(1,1,2), and v(1,2,2) for each sector of the L1 caches ma and mb form the data access amounts a(1,1,1), a(1,2,1), a(1,1,2), and a(1,2,2) for each sector of the L1 caches ma and mb.

Next, the resource allocation optimization module 22 calculates a cache miss generating index value I(L,R)=(I(1, 1), I(1,2)) for each sector of the L1 caches ma and mb (S85). Specifically, the cache miss generating index value I(1,1) represents the cache miss generating index value of the sector 0 ("R=1") of the entire L1 caches, and the cache miss generating index value I(1,2) represents the cache miss generating index value of the sector 1 ("R=2") of the entire L1 caches. That is, the resource allocation optimization module 22 calculates the cache miss generating index value for each sector.

The resource allocation optimization module 22 calculates the cache miss generating index value for each of the L1 caches ma and mb, based on the data access amount ratio in the volume. First, the resource allocation optimization module 22 calculates a data access amount A(L,R) (=(1,1)) of the reusability level "R=1" by adding the data access amount a(1,1,1) of the CPU core "C=1" and the reusability level "R=1", and the data access amount a(1,1,2) of the CPU core "C=2" and the reusability level "R=1". In the same way, the resource allocation optimization module 22 calculates the data access amount A(L,R) (=(1,2)) of the reusability level "R=2" by adding the data access amount a(1,2,1) of the CPU core "C=1" and the reusability level "R=2", and the data access amount a(1,2,2) of the CPU core "C=2" and the reusability level "R=2".

Then, the resource allocation optimization module 22 calculates the cache miss generating index value I(1,1) by dividing the data access amount A(1,1) of the reusability level "R=1" of the entire L1 caches by the volume V(1,1) of the sector 0 ("R=1") of the entire L1 caches. In the same way, the resource allocation optimization module 22 calculates the cache miss generating index value I(1,2) by dividing the data access amount A(1,2) of the reusability level "R=2" of the entire L1 caches by the volume V(1,2) of the sector 1 ("R=2") of the entire L1 caches.

Next, the resource allocation optimization module 22 increments the variable L (S86). Then, the resource allocation optimization module 22 determines whether or not the variable L is equal to or smaller than the variable P (S83). As described above, in the embodiment, "P=1". Therefore, according to this embodiment, since the variable L is greater than the variable P (NO in S83), the process of the flowchart in FIG. 18 ends. On the other hand, in a case where there exist cache memories having a plurality of hierarchies built in the CPU, the resource allocation optimization module 22 calculates the cache miss generating index value for the cache memory in each hierarchy.

FIG. 20 is a diagram illustrating an example of an operational flowchart for a calculation process of a cache miss generating index value of a shared cache memory, according to an embodiment. In the example, the resource allocation optimization module 22 calculates the cache miss generating index value of the L2 cache m2 in accordance with the operational flowchart of FIG. 20.

First, the resource allocation optimization module 22 substitutes a value obtained by incrementing the variable P, for the variable L (S91). In the example, the resource allocation optimization module 22 substitutes the value "2" for the variable L. Next, the resource allocation optimization module 22 calculates the data access amount of the L2 cache m2 (S92). Specifically, the resource allocation optimization module 22 calculates the data access amount A(L,R) (=(2,1)) of the reusability level "R=1" by adding the data access amount a(2,1,1) of the CPU core "C=1" and the reusability level "R=1", and the data access amount a(2,1,2) of the CPU core "C=2" and the reusability level "R=1", which have been calculated in step S84 of FIG. 18. In the same way, the resource allocation optimization module 22 calculates the data access amount A(L,R) (=(2,2)) of the reusability level "R=2" by adding the data access amount a(2,2,1) of the CPU core "C=1" and the reusability level "R=2", and the data access amount a(2,2,2) of the CPU core "C=2" and the reusability level "R=2".

Next, the resource allocation optimization module 22 determines whether or not the variable L is equal to or smaller than a variable M (S93). The variable M represents the maximum level of the shared cache memory. In the embodiment, the maximum level of the shared cache level is "2". Therefore, the variable L is equal to or smaller than the variable M (YES in S93). Next, in a case where the CPU includes the shared cache memory at the next level (L+1), the resource allocation optimization module 22 calculates the data access amounts A(3,1) and (3,2) for to the cache memory at the next level (S94). Specifically, the resource allocation optimization module 22 calculates the data access amounts A(3,1) and (3,2) of the L3 cache by calculating the volume V(L,R)=(V(2,1), V(2,2)) of the L2 cache m2 from the data access amount A(L,R) (=A(2,1) (2,2)) of the L2 cache m2.

Next, the resource allocation optimization module 22 calculates the cache miss generating index value I(L,R) (=I(2,1), I(2,2)) for each sector of the L2 cache m2 (S95). The resource allocation optimization module 22 uses the data access amount A(L,R) (=A(2,1), A(2,2)) for each reusability level (corresponding each sector) of the L2 cache m2, which has been calculated in step S92. In addition, the resource allocation optimization module 22 calculates the volume V(2,1) of the sector 0 and the volume V(2,2) of the sector 1. The size of one way is, for example, 512 bytes. For example, in a case where the sector division ratio of "sector 0:sector 1=2:8" is input as the pattern, the volume V(2,1) of the reusability level "R=1" (the sector 0) is "1024=512×2" bytes, and the volume V(2,2) of the reusability level "R=2" (the sector 1) is "4096=512×8" bytes.

Then, the resource allocation optimization module 22 calculates the cache miss generating index value I(2,1) by dividing the data access amount A(2,1) of the reusability level "R=1" of the L2 cache by the volume V(2,1) of the sector 0 ("R=1") of the L2 cache m2. In the same way, the resource allocation optimization module 22 calculates the cache miss generating index value I(2,2) by dividing the data access amount A(2,2) of the reusability level "R=2" of the L2 cache m2 by the volume V(2,2) of the sector 1 ("R=2") of the L2 cache m2.

Next, the resource allocation optimization module 22 increments the variable L (S96). Then, the resource allocation optimization module 22 determines whether or not the variable L is equal to or smaller than the variable M (S93). When the variable L is equal to or smaller than the variable M (YES in S93), that is, when the CPU is provided with the L3 cache, the resource allocation optimization module 22 calculates the cache miss generating index value of the L3 cache (S94 to S96).

As described above, with reference to FIGS. 18 and 20, the resource allocation optimization module 22 calculates the cache miss generating index value of the L1 caches ma and mb, and the L2 cache m2, in accordance with the pattern of the sector division ratio. Next, the resource allocation optimization module 22 calculates the frequency of the cache miss of the L1 caches ma and mb, and the L2 cache m2, by using the cache miss generating index value of the L1 caches ma and mb, and the L2 cache m2, as an input.

Specifically, Equation 1 for calculating the frequency of the cache miss M (1) of the L1 caches ma and mb is as follows.

$$M(1)=e(1)\times I(1,1)+e(2)\times I(1,2)+e(3)\times\log(A(1,1))+e(4)\times\log(A(1,2)) \quad \text{Equation 1}$$

The resource allocation optimization module 22 calculates the frequency of the cache miss, based on the cache miss generating index value and a logarithm of the data access amount. The value I(L,R) (=I(1,1), I(1,2)) is the cache miss generating index value for each sector (corresponding to each reusability level) of the L1 caches ma and mb. The value A(L,R) (=A(1,1), A(1,2)) is the data access amount for each sector (corresponding to each reusability level) of the L1 caches ma and mb. The coefficients e(1), e(2), e(3), and e(4) in Equation 1 are calculated in advance based on a multiple regression analysis by using design data. In this way, different coefficients are applied to each sector.

Equation 2 for calculating the frequency of the cache miss of the L2 cache m2 M (2) is, for example, as follows.

$$M(2)=f(1)\times I(2,1)+f(2)\times I(2,2)+f(3)\times\log(A(2,1))+f(4)\times\log(A(2,2)) \quad \text{Equation 2}$$

The value I(L,R) (=I(2,1) (2,2)) is the cache miss generating index value for each sector (each reusability level) of the L2 cache m2. The value A(L,R) (=A(2,1), A(2,2)) is the data access amount for each sector (reusability level) of the L2 cache m2. The coefficients f(1), f(2), f(3), and f(4) in Equation 2 is calculated in advance based on the multiple regression analysis by using the design data. The different coefficients are applied to each sector.

As described above, the resource allocation optimization module 22 calculates the frequency of the cache miss M(1) and frequency of the cache miss M(2) at each hierarchy level. In the case, the M(1) is the frequency of the cache miss of the L1 caches ma and mb, and the M(2) is the frequency of the cache miss of the L2 cache m2.

Next, the resource allocation optimization module 22 calculates the evaluation value indicating the processing delay time by inputting the calculated frequency of the cache miss M(1) and frequency of the cache miss M(2) at each hierarchy level. Equation 3 for calculating the evaluation value indicating the processing delay time is, for example, as follows.

$$P(1)\times M(1)+P(2)\times M(2) \quad \text{Equation 3}$$

The coefficients P(1) and P(2) in Equation 3 each represent a penalty per cache miss at each cache level. The coefficients P(1) and P(2) are calculated in advance based on the multiple regression analysis by using the design data.

The coefficients P(1) and P(2) are different from each other in each hierarchy level in Equation 3. The contribution ratio of the frequency of the cache miss to the processing delay time is different in each hierarchy at the cache level. Accordingly, the resource allocation optimization module 22 calculates the processing delay time with high accuracy by applying the coefficients P(1) and P(2) which has different weights in each hierarchy, to the frequency of the cache miss. This allows the optimal sector division ratio of the L2 cache m2 to be calculated based on the frequency of the cache miss of the cache memory at each level.

Meanwhile, in Equation 3, when the frequencies of the cache misses M(1) and M(2) are low, the evaluation value indicating the processing delay time becomes smaller. In addition, with reference to Equation 3, when the ratio of the frequency of the cache miss M(1) to the frequency of the cache miss M(2) is optimal, the evaluation value indicating the processing delay time becomes smaller. Therefore, in a case where the L1 cache is provided with the sector cache mechanism, it is possible to optimize the sector division ratio of the L1 cache in addition to the L2 cache m2.

As described above, when the computation node 300 includes the shared cache memory having the plurality of hierarchies, the contribution ratio of the frequency of the cache miss to the processing delay time becomes different at each hierarchy level of the cache level. Accordingly, the resource allocation optimization module 22 does not set the frequency of the cache miss at each hierarchy level but sets the processing delay time in the computation node 300 as an index of the performance corresponding to the sector division ratio. This allows the resource allocation optimization module 22 to calculate more proper sector division ratio.

The embodiments are not limited to this example. The resource allocation optimization module 22 may set the frequency of the cache miss as an index of the performance corresponding to the sector division ratio. The resource allocation optimization module 22 may set the cache miss generating index value for each sector as an index of the performance corresponding to the sector division ratio.

Next, detailed description of the process of the cache sector allocation control module 23 of the execution phase (FIGS. 6 and 7) will be given.

Cache Sector Allocation Control Process

Figure 21:
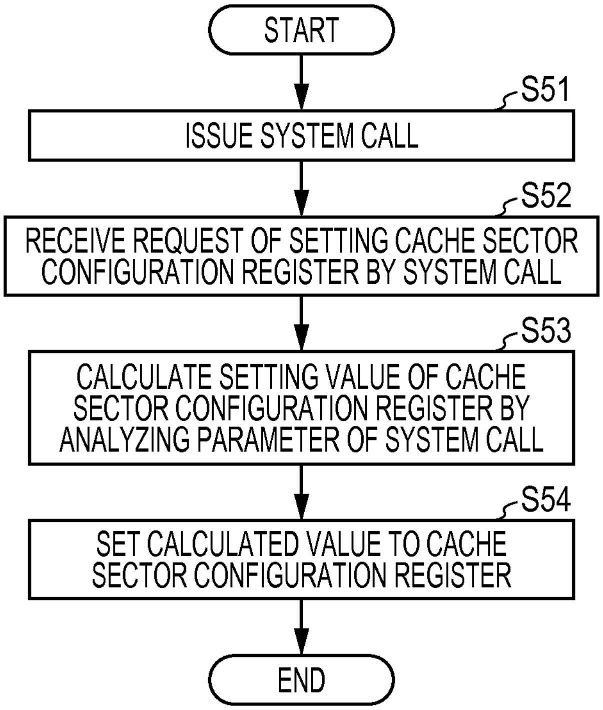
FIG. 21 is a diagram illustrating an example of an operational flowchart for a cache sector allocation control process (S22 and S25) illustrated in FIG. 12, according to an embodiment.

FIG. 21 is a diagram illustrating an example of an operational flowchart for a cache sector allocation control process, according to an embodiment, which has been illustrated at S22 and S25 in FIG. 12. The cache sector allocation control module 23 receives the sector division ratio which is calculated by the resource allocation optimization module 22 and the instruction to issue the system call, as illustrated in FIG. 13 to FIG. 20. Then, the cache sector allocation control module 23 issues the system call the L2 cache m2 (S51). The maximum number of ways for each sector is designated as a parameter of the system call.

In response to the issue of the system call, a sector configuration register driver 25 receives a request to set the sector configuration register (S52). Then, the sector configuration register driver 25 calculates a setting value of the sector configuration register by analyzing the parameter of the system call (S53). Thereafter, the sector configuration register driver 25 sets the calculated value to the sector configuration register (S54). Accordingly, the sector division ratio is changed in the L2 cache m2.

Figure 22:
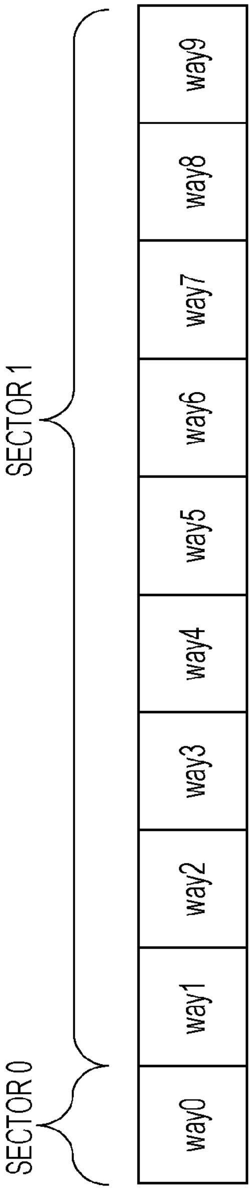
FIG. 22 is a diagram illustrating a modification example of the sector division ratio, according to an embodiment.

FIG. 22 is a diagram illustrating an example of a modification on a sector division ratio, according to an embodiment. For example, at the time t2 in FIG. 8, the resource allocation optimization module 22 calculates the sector division ratio "sector 0:sector 1=1:9". Therefore, the cache sector allocation control module 23 issues the system call for changing the number of ways of the sector 0 to 1 and the number of ways of the sector 1 to 9. This allows the computation node 300 executing a job 1 and a job 2 to set the sector division ratio of the L2 cache m2 at a sector division ratio that improves processing performance of the loop process A and the loop process B. Therefore, the computation node 300 may execute the processes of the job 1 and the job 2 at further high speed by improving the processing performance of the loop process A and the loop process B.

As described above, the information processing apparatus (the computation node 300) of the embodiment is configured to include a shared cache memory provided with a function of sectors for dividing the shared cache memory in accordance with the reusability level of data, and a controller which changes the sector division ratio of the shared cache memory. In addition, during execution of first and second jobs, in response to a designation of a program of the second job, the controller calculates the sector division ratio, based on the data access amount including the sizes and access counts of data to which the first and second jobs access, and the volume of the shared cache memory, and then changes the sector division ratio of the shared cache memory to the calculated sector division ratio.

With this, during the job execution, the information processing apparatus may calculate the sector division ratio which is optimized to the plurality of jobs in accordance with the data access amount of the plurality of running jobs and the configuration of the sector of the cache memory to be mounted. Then, the information processing apparatus may improve the processing performance of the plurality of jobs, based on the optimal sector division ratio. Therefore, the information processing apparatus may optimize the sector division ratio with respect to the plurality of running jobs even in a case where the running job is in any combination.

In addition, the controller of the information processing apparatus of the embodiment calculates the sector division ratio, based on first and second data access amounts that are obtained by summing up the sizes of each data of the data access amount of the first and second jobs in execution for each of a first reusability level and a second reusability level greater than the first reusability level, and first and second sector volumes of the shared cache memory respectively corresponding to the first and second reusability levels.

This allows the information processing apparatus to calculate the sum of the data access amounts for each reusability level of the plurality of running jobs. Then, the information processing apparatus may calculate the sector division ratio which is optimized to the plurality of jobs, based on the data access amount for each reusability level and the volume for sectors corresponding to the reusability level of the shared cache memory.

In addition, the controller of the information processing apparatus of the embodiment calculates the frequency of the cache miss, based on the data access amounts of the first and second sectors and the first sector volume and second sector volume, and calculates the sector division ratio, based on the calculated frequency of the cache miss. This allows the information processing apparatus to determine the sector division ratio which is optimized to the plurality of jobs by calculating the frequency of the cache miss based on the data access amount for each sector and the volume for each sector.

In addition, the controller of the information processing apparatus of the embodiment calculates a first index value indicating a cache miss generating index of the first sector, and a second index value indicating a cache miss generating index of the second sector, based on the data access amounts of the first and second sectors and the first sector volume and second sector volume, and calculates the frequency of the cache miss by applying a different weight to each of the first index value and the second index value. Accordingly, the information processing apparatus may calculate the frequency of the cache miss based on the cache miss generating index value for each sector which is calculated based on the data access amount for each sector and the volume for each sector. In addition, the information processing apparatus may calculate the frequency of the cache miss in the shared cache memory with high accuracy, by applying a weight different for each sector, to the calculated cache miss generating index value for each sector.

Further, the shared cache memory of the information processing apparatus of the embodiment, is a shared cache memory having the a plurality of hierarchies. In addition, the controller calculates a first frequency of the cache miss of the shared cache memory of a first hierarchy and a second frequency of the cache miss of the shared cache memory of a second hierarchy, and calculates a value indicating the processing delay time by applying the different weight to each of the first frequency of the cache miss and the second frequency of the cache miss. This allows the information processing apparatus to calculate the processing delay time in the information processing apparatus with high accuracy, by applying the different weight for each hierarchy, to the frequency of the cache miss of the cache memory in each hierarchy.

In addition, the controller of the information processing apparatus of the embodiment calculates a sector division ratio for which a value representing the processing delay time becomes minimum. This allows the information processing apparatus to reduce the total processing time for the plurality of jobs executed in the information processing apparatus.

According to the information processing apparatus of the embodiment, an optimization section corresponds to a loop process. Therefore, the information processing apparatus may set, among processes in the program, a loop process having a high influence on the processing time, as a target process for optimization of the sector division ratio.

Further, the controller of the information processing apparatus of the embodiment restores the currently-used sector division ratio to the sector division ratio before being changed, in response to the designation of the program of the second job. Therefore, the information processing apparatus may return to the original sector division ratio when the optimization section ends. That is, the information processing apparatus may optimally change the sector division ratio with respect to the plurality of running jobs by setting only the optimization section as a target.

According to the information processing apparatus of the embodiment, the shared cache memory is a shared cache memory having one or more hierarchies, and the sector division ratio is obtained as a sector division ratio of the shared cache memory at each hierarchy. Therefore, the information processing apparatus may optimize the division ratio for each sector of the shared cache memory of the plurality of hierarchies even in a case where the information processing apparatus is provided with the shared cache memory having plurality of hierarches.

In addition, the controller of the information processing apparatus of the embodiment acquires a program generated by adding the data access amount of the optimization section and a code designating the optimization section to the program when the program is compiled, and then executes the acquired program as a job. Therefore, the information processing apparatus may calculate the sector division ratio which is optimized to the plurality of jobs during job execution.

Second Embodiment

In the second embodiment, in addition to the configuration of the first embodiment, an information processing system executes an optimization process of allocating the computation node 300 to the job. The information processing system, when allocating the computation node 300 to the job, allocates an optimal computation node 300 of the plurality of computation nodes 300 to the job.

Figure 23:
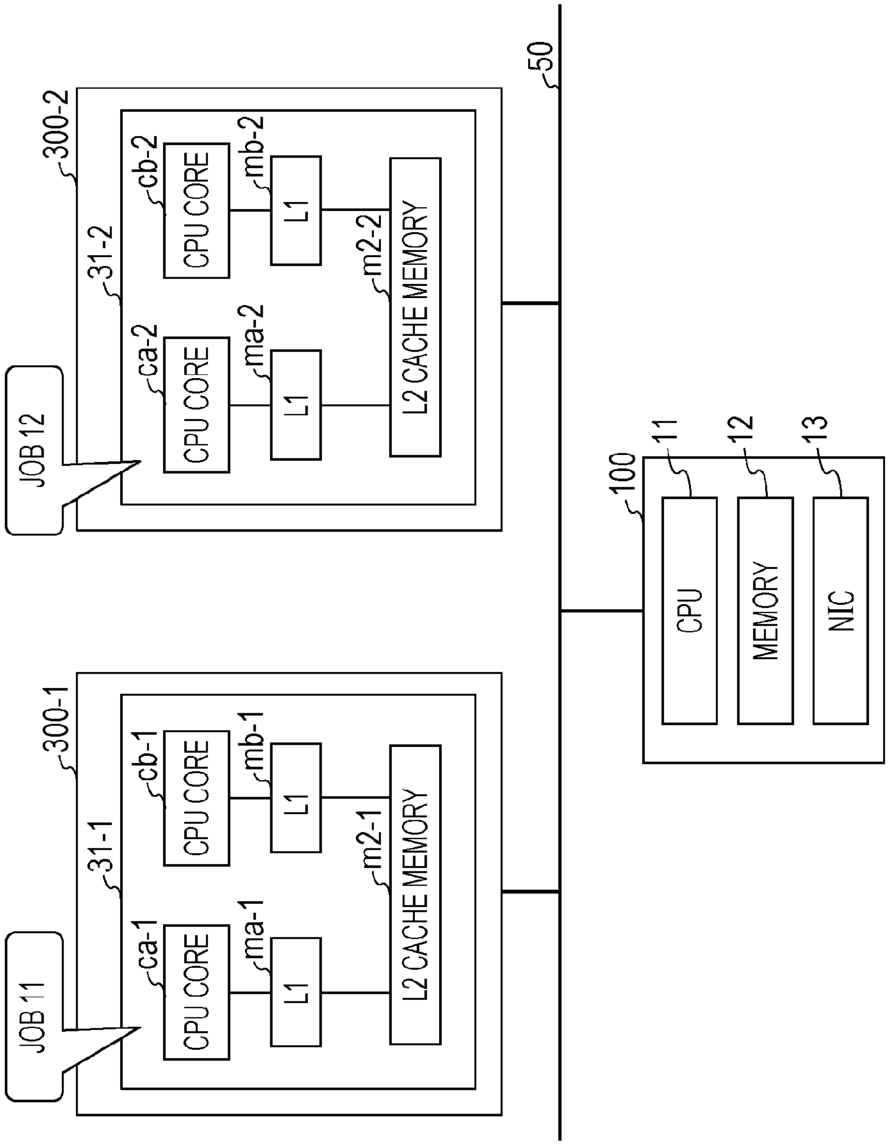
FIG. 23 is a diagram illustrating a process of allocating a job to a CPU, according to a second embodiment.

FIG. 23 is a diagram illustrating an example of a process of allocating a computation node to a job, according to a second embodiment. FIG. 23 illustrates an example of a case where the information processing system includes two computation nodes 300-1 and 300-2. Accordingly, in the example of FIG. 23, the information processing system selects the optimal computation node 300 which is to be allocated to the job, from the two computation nodes 300-1 and 300-2. In addition, a CPU 31-1 and a CPU 31-2 which are included in the computation nodes 300-1 and 300-2, include CPU cores ca-1 and cb-1, and CPU cores ca-2 and cb-2, respectively. In the example of FIG. 23, the CPU core ca-1 of the computation node 300-1 is executing a job 11, while the CPU core ca-2 of the computation node 300-2 is executing a job 12.

In the above example, only two computation nodes 300-1 and 300-2 are illustrated for simple description, but typically, the information processing system includes a large number of computation nodes 300. Accordingly, the information processing system selects the optimal computation node 300 which is to be allocated to the job from the large number of computation nodes 300.

In a case where a new job 13 is to be allocated to the computation node 300, the control node 100 calculates the evaluation value indicating the processing delay time of a plurality of jobs when assuming that the job 13 is allocated to each of the CPU core cb-1 of the computation node 300-1 and the CPU core cb-2 of the computation node 300-2. Then, the control node 100 allocates the job to one of the computation nodes 300 so as to reduce variance of the processing delay time between the computation nodes 300-1 and 300-2. Reduction of variance of the processing delay time between the computation nodes 300-1 and 300-2 means that the processing delay time is equalized between the plurality of computation nodes 300-1 and 300-2. Typically, the whole processing time of the information processing system corresponds to the processing time of the computation node with the lowest processing speed, among the plurality of computation nodes 300-1 and 300-2. Therefore, when the processing delay time is equalized between the computation nodes 300, it is possible to reduce degradation of the performance of the information processing system when the plurality of jobs are executed in parallel.

In this way, the control node 100 allocates the job to one of the computation nodes 300 for which the variance of the processing delay time is reduced between the computation nodes 300 in the information processing system. In the case, in a manner similar to the first embodiment, the processing delay time means a processing delay time when the sector division ratio of the L2 cache m2 is optimized.

In the second embodiment, the hardware configuration including the computation node 300, the control node 100, the compile node 500, and the file server 600 is the same as that in the first embodiment. A job scheduler program pr1 of the control node 100 in the second embodiment includes a CPU core allocation control module 26 (not illustrated) in addition to the resource allocation optimization module 22.

Figure 24:
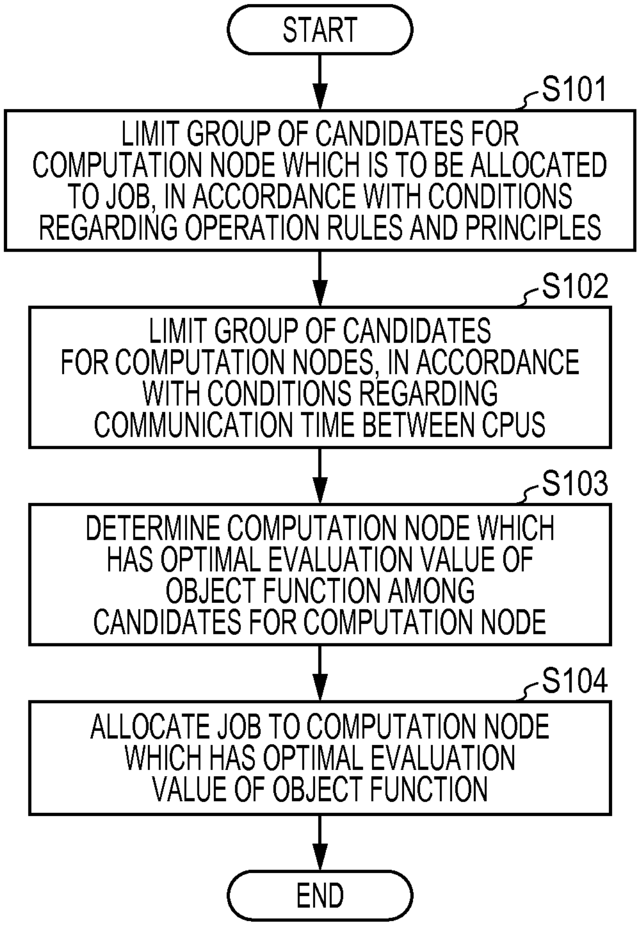
FIG. 24 is a diagram illustrating an example of an operational flowchart for a process of a CPU core allocation control module, according to an embodiment.

FIG. 24 is a diagram illustrating an example of an operational flowchart for a CPU core allocation control module, according to a second embodiment. The CPU core allocation control module 26 of the control node 100 determines a computation node 300 which is to be allocated to a new target job when the new target job (hereinafter, referred to as a new job) is generated. First, the CPU core allocation control module 26 limits a group of candidates for the computation node 300 which is to be allocated to the new job, from among the computation nodes 300 included in the information processing system, in accordance with conditions regarding operation rules and principles (S101).

Next, the CPU core allocation control module 26 limits the group of candidates for the computation node 300 which is to be allocated to the new job, depending on the conditions relating to a communication time between the CPUs (S102). At this time, it is assumed that at least one of the CPU cores which are included in the candidates for the computation node 300 is able to be allocated to the new job. According to the example in FIG. 23, the CPU core allocation control module 26 limits the computation node 300-1 and the computation node 300-2 as the candidates.

Next, the CPU core allocation control module 26 determines a computation node 300 having the optimal evaluation value of the object function among the candidates of computation nodes 300, based on a process and thread of the new job (S103). The object function is a function which is used to calculate variance of the processing delay time between the plurality of computation nodes 300 which are included in the information processing system. Specifically, the CPU core allocation control module 26 calculate the variance of the processing delay time between the plurality of computation nodes 300 for each of a case where the new job is allocated to the CPU core cb-1 of the computation node 300-1 and a case where the new job is allocated to the CPU core cb-2 of the computation node 300-2. Detailed description of the process will be made later. Then, the CPU core allocation control module 26 allocates the computation node 300 determined in step S103 to the new job. (S104).

Next, the detailed description of the process in step S103 of FIG. 24 will be made. The CPU core allocation control module 26 calculates the variance of the processing delay time for each candidate of the computation node 300. In the example, the candidates of the computation nodes 300 are the computation nodes 300-1 and 300-2. Therefore, as a first pattern, the CPU core allocation control module 26 calculates a value indicating the processing delay time for each of the computation nodes 300-1 and 300-2 when allocating the job to the CPU core cb-1 of the computation node 300-1. Then, the CPU core allocation control module 26 calculates the variance of the calculated processing delay time between the computation nodes 300-1 and 300-2.

In addition, as a second pattern, the CPU core allocation control module 26 calculates a value indicating the processing delay time for each of the computation nodes 300-1 and 300-2 when allocating the job to the CPU core cb-2 of the computation node 300-2. Then, the CPU core allocation control module 26 calculates the variance of the calculated processing delay time between the computation nodes 300-1 and 300-2.

Then, the CPU core allocation control module 26 determines the pattern, in which the variance of the processing delay time is reduced, from the first pattern and the second pattern. The CPU core allocation control module 26 allocates one of the computation node 300-1 and 300-2 having the pattern in which the variance of the processing delay time is reduced, to the job.

More specifically, a calculation process of the variance of the processing delay time for each pattern will be described. In the example, the calculation process of a value indicating the processing delay time will be described in a case where the job is allocated to the CPU core cb-1 of the computation node 300-1 (the first pattern). The CPU core allocation control module 26 calculates the frequencies of the cache miss M(1) and M(2) in a case where the computation node 300-1 is allocated to the new job. A method of calculating the frequencies of cache miss M(1) and M(2) is the same as that in the first embodiment. Meanwhile, at this time, the frequencies of cache miss M(1) and M(2) are values in a state where the sector division ratio of the cache memory of the computation node 300-1 is optimized. The frequencies of the cache miss M(1) and M(2) of the computation node 300-1 are referred to as the frequencies of the cache miss M(1,1) and M(1,2).

The CPU core allocation control module 26 calculates the frequencies of the cache miss M(1) and M(2) in the computation node 300-2. The frequencies of the cache miss M(1) and M(2) of the computation node 300-2 are referred to as the frequencies of the cache miss M(2,1) and M(2,2).

Then, in a manner similar to the first embodiment, the CPU core allocation control module 26 calculates a processing delay time D(i) for each of the computation node 300-1 and 300-2, based on the frequency of the cache miss. A variable i represents a computation node. Equation for calculating the processing delay time D(i) is the following Equation 4.

$$D(i)=P(i,1)\times M(i,1)+P(i,2)\times M(i,2) \qquad \text{Equation 4}$$

In Equation 4, the variable P (a node number, L) (=P(i,1), P(i,2)) is designated in advance based on the design data or the like. That is, according to Equation 4, a different coefficient P is given to each computation node. This allows the CPU core allocation control module 26 to calculate the processing delay times D(1) and D(2) of each of the computation nodes 300-1 and 300-2, in the first pattern. Then, the CPU core allocation control module 26 calculate the variance of the processing delay times D(1) and D(2). The CPU core allocation control module 26 calculates the variance of the processing delay time between the computation nodes by inputting an average value D of the processing delay time D(i) in accordance with the following Equation 5.

$$(1/k)\times\Sigma(D(i)-D)^2 \qquad \text{Equation 5}$$

A variable k in Equation 5 indicates the number of the computation nodes 300. In this example, "k=2".

In this way, the CPU core allocation control module 26 calculates the variance of the processing delay time in a case where the CPU core cb-1 of the computation node 300-1 is allocated to the job (the first pattern). In the same way, the CPU core allocation control module 26 calculates the variance of the processing delay time in a case where the CPU core cb-2 of the computation node 300-2 is allocated to the job (the second pattern). Then, the CPU core allocation control module 26 allocates the computation node for which the variance of the processing delay time is reduced, to the new job, among the computation nodes 300-1 (the first pattern) and 300-2 (the second pattern).

As described above, according to the information processing system of the embodiment, it is possible to select the optimal computation node 300 which is to be allocated to the new job, from the plurality of computation nodes 300. At this time, the information processing system allocates, among the plurality of computation nodes 300, the computation node 300 for which the variance of the processing delay time is the minimum, to the new job. Therefore, the information processing system may reduce a time for job execution in the entire information processing system by allocating the new job to the optimal computation node 300.

Other Embodiments

According to the embodiments, a case where the CPU 31 of the computation node 300 includes only the L2 cache m2 as the shared cache memory has been illustrated. The information processing system of the embodiment is applicable to even a case where the CPU 31 further includes the L3 cache in addition to the L2 cache m2. In this case, applying the processes described in the first embodiment to the information processing system of the embodiment allows the optimal sector division ratio in the L2 cache m2 and the L3 cache to be calculated.

In addition, the information processing system of the embodiment is applicable to a case where the CPU 31 includes the L1 cache and the L2 cache which are built in each of the CPU cores and the L3 cache which is common to each of the CPU cores. In this case, the information processing system of the embodiment may calculate the optimal sector division ratio in the L3 cache by applying the process illustrated in the first embodiment.

Further, while a case where the L1 cache of the embodiment is not provided with the sector function has been described, in a case where the L1 cache is provided with the sector function, the information processing system of the embodiment is effective to the optimization of the sector division ratio of the L1 cache.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:

a shared cache memory configured to be divided into sectors by assigning one or more ways to each sector in association with a reusability level of data; and a controller configured to change a sector division ratio of the shared cache memory in accordance with a reusability level of data, the sector division ratio indicating a ratio between way counts of the divided sectors of the shared cache memory, the way count being a number of ways assigned to each sector, wherein when a first job and a second job are being executed in parallel, in response to a designation of a program of the second job, the controller:

calculates the sector division ratio, based on data access amount and a volume of the shared cache memory, the data access amount including a size and an access count of data accessed by the first and second jobs, and changes the sector division ratio of the shared cache memory to the calculated sector division ratio.

2. The apparatus of claim 1, wherein the controller calculates the sector division ratio, based on first and second data access amounts and first and second sector volumes of the shared cache memory, the first data access amount being obtained by summing up sizes of data accessed by the first job for each of first and second reusability levels of data, the second access amount being obtained by summing up sizes of data accessed by the second job for each of the first and second reusability levels of data, the first and second reusability levels being determined in accordance with the access counts of data accessed by the first and second jobs so that the second reusability level is greater than the first reusability level, the first and second sector volumes of the shared cache memory being respectively associated with the first and second reusability levels.

3. The apparatus of claim 2, wherein the controller calculates a cache-miss count representing a number of occurrences of cache misses, based on data access amounts of the first and second sectors and volumes of the first and second sectors, and determines the sector division ratio based on the calculated cache-miss count.

4. The apparatus of claim 3, wherein the controller calculates the cache-miss count by:

calculating a first index value representing an index of occurrences of cache misses for the first sector and a second index value representing an index of occurrences of cache misses for the second sector, based on the data access amounts of the first and second sectors and the volumes of the first and second sectors, and applying first and second weights to the calculated first and second index values, respectively.

5. The apparatus of claim 3, wherein the shared cache memory is configured to have a plurality of hierarchies including first and second hierarchies; and the controller calculates a processing delay time by:

calculating a first cache-miss count representing a number of occurrences of cache misses for the shared cache memory of the first hierarchy and a second cache-miss count representing a number of occurrences of cache misses for the shared cache memory of the second hierarchy, and applying first and second weights to the calculated first and second cache-miss counts, respectively.

6. The apparatus of claim 5, wherein the controller calculates the sector division ratio so that the processing delay time value becomes minimum.

7. The apparatus of claim 1, wherein an optimization section of the program is designated; and the controller calculates the sector division ratio by using data access amount including a size and an access count of data caused by executing the optimization section of the program of accessing.

8. The apparatus of claim 7, wherein the controller acquires the program that is generated, when compiling the program, by adding data access amount for the optimization section and a code designating the optimization section to the program, and executes the acquired program as a job.

9. The apparatus of claim 1, wherein the controller restores the changed sector division ratio to the sector division ratio before being changed, in response to the designation of the program of the second job.

10. The apparatus of claim 1, wherein the shared cache memory is configured to have one or more hierarches; and the controller calculates the sector division ratio for each of the one or more hierarches of the shared cache memory.

11. The apparatus of claim 1, further comprising:

first and second arithmetic units, wherein the first arithmetic unit executes the first job and the second arithmetic unit executes the second job.

12. A system comprising:

a first information processing apparatus including:

a shared cache memory configured to be divided into sectors by assigning one or more ways to each sector in association with a reusability level of data, and a first controller configured to change a sector division ratio of the shared cache memory in accordance with a reusability level of data, the sector division ratio indicating a ratio between way counts of the divided sectors of the shared cache memory, the way count being a number of ways assigned to each sector; and a second information processing apparatus including a second controller configured to calculate the sector division ratio of the shared cache memory, wherein when a first job and a second job are being executed in parallel in the first information processing apparatus, in response to a designation of a program of the second job, the first controller of the first information processing apparatus notifies the second information processing apparatus of an instruction to calculate the sector division ratio of the shared cache memory;

the second controller of the second information processing apparatus calculates the sector division ratio, based on data access amount and a volume of the shared cache memory, the data access amount including a size and an access count of data accessed by the first and second jobs, and notifies the first information processing apparatus of the calculated sector division ratio; and the first controller of the first information processing apparatus changes the sector division ratio of the shared cache memory to the sector division ratio calculated by the second controller of the second information processing apparatus.

13. The system of claim 12, wherein the second controller of the second information processing apparatus calculates the sector division ratio, based on first and second data access amounts and first and second sector volumes of the shared cache memory, the first data access amount being obtained by summing up sizes of data accessed by the first job for each of first and second reusability levels of data, the second access amount being obtained by summing up sizes of data accessed by the second job for each of the first and second reusability levels of data, the first and second reusability levels being determined in accordance with the access counts of data accessed by the first and second jobs so that the second reusability level is greater than the first reusability level, the first and second sector volumes of the shared cache memory being respectively associated with the first and second reusability levels.

14. The system of claim 13, wherein the second controller of the second information processing apparatus calculates a cache-miss count representing a number of occurrences of cache misses, based on data access amounts of the first and second sectors and volumes of the first and second sectors, and determines the sector division ratio based on the calculated cache-miss count.

15. A method performed in a system including first and second information processing apparatuses, the first information processing apparatus including a shared cache memory configured to be divided into sectors by assigning one or more ways to each sector in association with a reusability level of data, the method comprising:

causing the second information processing apparatus to, when a first job and a second job are being executed in parallel in the first information processing apparatus, in response to a designation of a program of the second job, calculate a sector division ratio indicating a ratio between way counts of the divided sectors of the shared cache memory, the way count being a number of ways assigned to each sector; and causing the first information processing apparatus to change the sector division ratio of the shared cache memory to the sector division ratio calculated by the second information processing apparatus.

16. The method of claim 15, further comprising:

causing the first information processing apparatus to execute the first and second jobs, and to notify the second information processing apparatus of an instruction for calculating the sector division ratio of the shared cache memory, in response to designation of the program of the second job, wherein the first information processing apparatus changes the sector division ratio of the shared cache memory to the sector division ratio notified from the second information processing apparatus.

17. The method of claim 15, further comprising:

causing the second information processing apparatus to calculate the sector division ratio, based on first and second data access amounts and first and second sector volumes of the shared cache memory, the first data access amount being obtained by summing up sizes of data accessed by the first job for each of first and second reusability levels of data, the second access amount being obtained by summing up sizes of data accessed by the second job for each of the first and second reusability levels of data, the first and second reusability levels being determined in accordance with the access counts of data accessed by the first and second jobs so that the second reusability level is greater than the first reusability level, the first and second sector volumes of the shared cache memory being respectively associated with the first and second reusability levels.

18. A non-transitory, computer-readable recording medium having stored therein a program for causing a computer to execute a process, the computer being included in each of the first and second information processing apparatuses, the first information processing apparatus including a shared cache memory configured to be divided into sectors by assigning one or more ways to each sector in association with a reusability level of data, the process comprising:

causing the second information processing apparatus to, when a first job and a second job are being executed in parallel in the first information processing apparatus, in response to a designation of a program of the second job, calculate a sector division ratio indicating a ratio between way counts of the divided sectors of the shared cache memory, the way count being a number of ways assigned to each sector; and causing the first information processing apparatus to change the sector division ratio of the shared cache memory to the sector division ratio calculated by the second information processing apparatus.

19. The non-transitory, computer-readable recording medium of claim 18, the process further comprising:

causing the first information processing apparatus to execute the first and second jobs, and to notify the second information processing apparatus of an instruction for calculating the sector division ratio of the shared cache memory, in response to designation of the program of the second job, wherein the first information processing apparatus changes the sector division ratio of the shared cache memory to the sector division ratio notified from the second information processing apparatus.

20. The non-transitory, computer-readable recording medium of claim 18, the process further comprising:

causing the second information processing apparatus to calculate the sector division ratio, based on first and second data access amounts and first and second sector volumes of the shared cache memory, the first data access amount being obtained by summing up sizes of data accessed by the first job for each of first and second reusability levels of data, the second access amount being obtained by summing up sizes of data accessed by the second job for each of the first and second reusability levels of data, the first and second reusability levels being determined in accordance with the access counts of data accessed by the first and second jobs so that the second reusability level is greater than the first reusability level, the first and second sector volumes of the shared cache memory being respectively associated with the first and second reusability levels.

* * * * *